United States Patent
Allen

(10) Patent No.: US 10,859,436 B2
(45) Date of Patent: Dec. 8, 2020

(54) SPECTROMETER ON A CHIP

(71) Applicant: Renesas Electronics America Inc., Milpitas, CA (US)

(72) Inventor: Dan Gilbert Allen, Springville, UT (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/279,911

(22) Filed: Feb. 19, 2019

(65) Prior Publication Data

US 2020/0264043 A1 Aug. 20, 2020

(51) Int. Cl.
*G01J 3/02* (2006.01)
*G01J 3/51* (2006.01)
*G01J 3/28* (2006.01)
*G01J 3/18* (2006.01)

(52) U.S. Cl.
CPC .......... *G01J 3/0208* (2013.01); *G01J 3/0229* (2013.01); *G01J 3/0237* (2013.01); *G01J 3/18* (2013.01); *G01J 3/2823* (2013.01); *G01J 3/51* (2013.01)

(58) Field of Classification Search
CPC ...... G01J 3/0208; G01J 3/0229; G01J 3/0237; G01J 3/18; G01J 3/2823; G01J 3/51
See application file for complete search history.

(56) References Cited

U.S. PATENT DOCUMENTS

| | | | | |
|---|---|---|---|---|
| 2006/0126326 A1* | 6/2006 | Ng | ............................ | F21K 9/00 362/231 |
| 2013/0293749 A1* | 11/2013 | Vaartstra | ................ | H04N 9/045 348/273 |
| 2014/0085632 A1* | 3/2014 | Preston | .................. | G01J 3/0205 356/326 |
| 2018/0238794 A1* | 8/2018 | Kangas | .................. | G01N 21/35 |
| 2019/0237630 A1* | 8/2019 | Check | ................... | H01L 33/382 |

OTHER PUBLICATIONS

"Panasonic Develops Technology for Highly Sensitive Image Sensors Using Micro Color Splitters," Headquarters News. Feb. 4, 2013. Available online at: https://news.panasonic.com/global/press/data/2013/02/en130204-6/en130204-6.html. pp. 1-3.

(Continued)

*Primary Examiner* — Dominic J Bologna
(74) *Attorney, Agent, or Firm* — Haynes and Boone, LLP

(57) ABSTRACT

A spectrometer having a plasmonic filter/microlens arrangement is provided. The spectrometer can include a controller; an image sensor with a pixel array formed by a plurality of pixels coupled to the controller; and an optical layer over the image sensor. The optical layer can include a plasmonic microlens array having a plurality of microlenses positioned over the spacer layer, each microlens of the plasmonic microlens array focusing light on one of the plurality of pixels, and a plasmonic filter array arranged with the plasmonic microlens array such that light incident on each of the plurality of pixels has a transmission function. The microlenses and plasmonic filters can be formed of a composite structure.

34 Claims, 18 Drawing Sheets

(56) References Cited

OTHER PUBLICATIONS

Yu et al., "Broadband Metallic Planar Microlenses in an Array: the Focusing Coupling Effect," Nanoscale Research Letters. 11:109. Feb. 27, 2016. Available online at: https://nanoscalereslett.springeropen.com/articles/10.1186/s11671-016-1333-9. pp. 1-31.

Saxena et al., "Plasmonic Micro Lens for Extraordinary Transmission of Broadband Light," Scientific Reports 4, Article No. 5586. 2014. Available online at: https://www.nature.com/articles/srep05586. pp. 1-17.

Jang et al., "Experimental Demonstration of Adaptive Infrared Multispectral Imaging using Plasmonic Filter Array," Scientific Reports 6, Article No. 34876. Oct. 10, 2016. Available online at: https://www.nature.com/articles/srep34876. pp. 1-26.

Fu et al., "Plasmonic Lenses," Plasmonics-Principles and Applications. Chapter 8, Intech. 2012. Available online at: https://cdn.intechopen.com/pdfs-wm/40334.pdf. pp. 1-47.

Fu et al., "Ultra-Enhanced Lasing Effect of Plasmonic Lens Structured with Elliptical Nanopinholes Distributed in Variant Periods," Plasmonics, 5 (2). Sep. 20, 2009. pp. 1-6.

Shi et al., "Polarization Effect on Focusing of a Plasmonic Lens Structured with Radialized and Chirped Elliptical Nanopinholes," Plasmonics 5(2). 2010.

Wang et al., "Polarization-Independent Longitudinal Multi-Focusing Metalens," Optics Express vol. 23, No. 23. 2015. Available online at: https://www.osapublishing.org/DirectPDFAccess/FBED16A6-F757-ADA7-D1E0C376FA3284B1_332286/oe-23-23-29855.pdf?da=1&id=332286&seq=0&mobile=no. pp. 1-12.

Shen et al., "Fast-Fourier-Transform Based Numerical Integration Method for the Rayleigh-Sommerfield Diffraction Formula," Appl. Opt. 45. 2006.

Fu et al., "Nanopinholes-Based Optical Superlens," Research Letters in Physics. Hindawi Publishing Corporation. Oct. 10, 2007. pp. 1-6.

\* cited by examiner

50nm thick

100nm thick

**100 nm
(+5nm)**

**100 nm
(+35nm)**

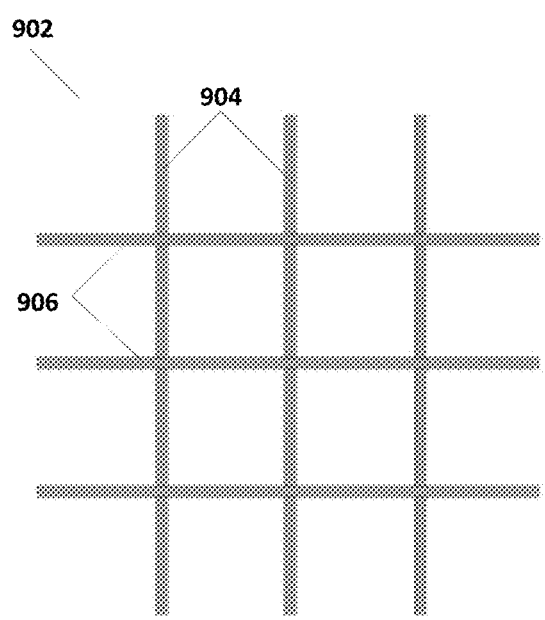
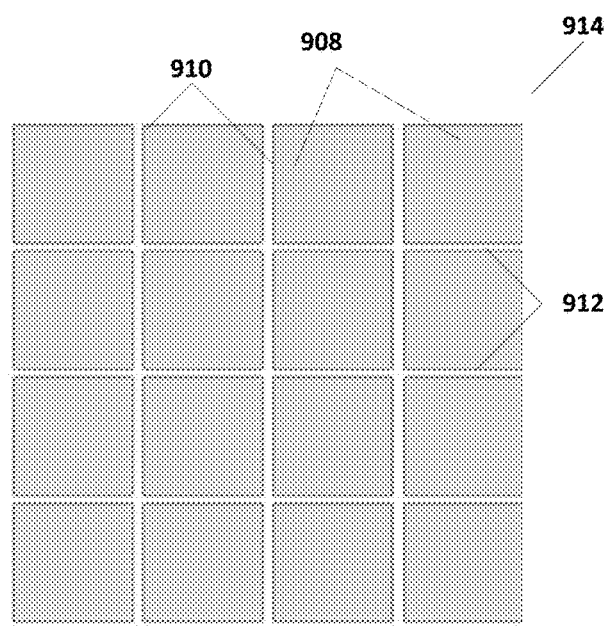
Figure 9A
Figure 9B

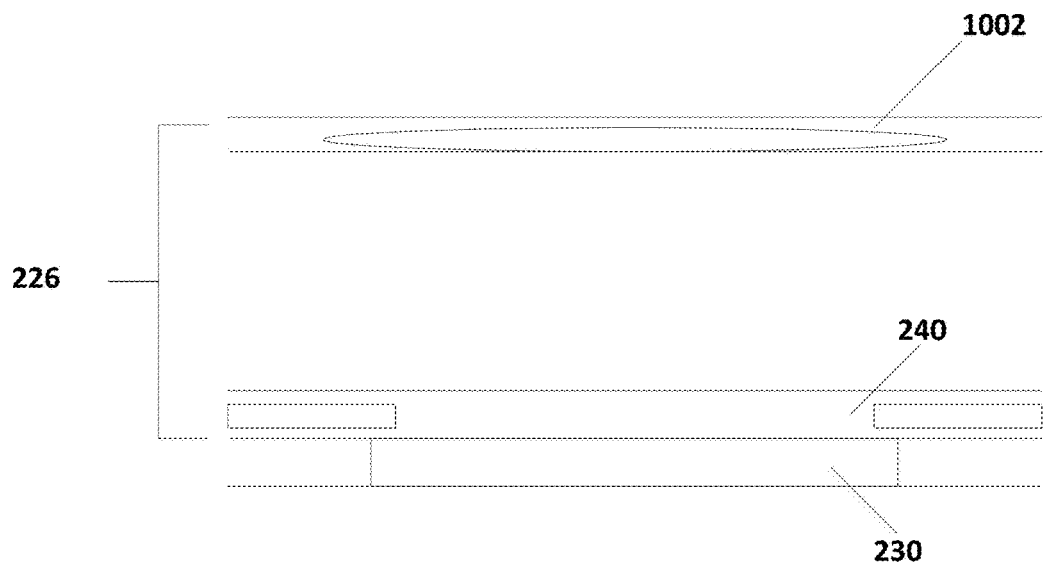
Figure 10A
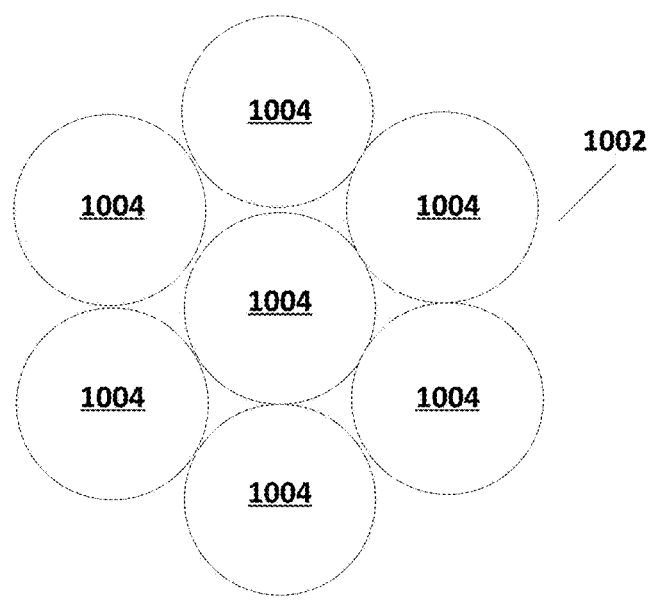
Figure 10B
Figure 10

SPECTROMETER ON A CHIP

TECHNICAL FIELD

Embodiments of the present invention are related to spectrometer sensors and, in particular, to wafer level spectrometers.

DISCUSSION OF RELATED ART

Spectrometers can be introduced to mobile devices for a variety of uses involving analysis and identification of target substances. In general, a spectrometer refers to a device that provides a light source to provide a light onto a substance and then monitors the light received from the substance. The light provided by the light source can be any frequency or range of frequencies and can be continuous during the time the spectrometer is active or may be pulsed. These parameters depend on the particular application. One particular application, for example, uses a light source that produces infrared or near-infrared radiation.

When irradiated by the light source, the target substance absorbs at least a part of the incident radiation emitted by the light source and radiates a characteristic spectrum of light that, when properly analyzed, can be used to identify constituent components of the substance. The light received from the target substance is spectrally analyzed by the spectrometer and the spectral composition of the received light is indicative of the chemical composition of the substance.

Determining the chemical composition of a substance has a number of practical applications. For example, the spectral scan of fruits and vegetables can help determine the ripeness or nutritional value provided. Safety of food or drinks can also be determined real-time by spectral scanning. Spectroscopic scans can also be used to monitor health issues, for example the oxygen or sugar content of blood without actually taking blood samples. Furthermore, spectroscopic scanning can be used to monitor atmospheric conditions such as the constituents of the gas.

Also, spectral scans of ambient light (in the absence of light from a light source) can be used to adjust light level sensitivities for a camera. Such a method can help achieve clearer and more accurate photographs on your mobile device.

Spectrometers based on arrays of filters have been developed. In one example, a variety of filters is patterned or aligned over an image sensor array. The intensity of light received on each channel is determined by the passband of the filter over that respective pixel. The received pattern of light may be transformed to a wavelength basis representation of the light intensity by a linear transformation.

For this type of spectrometer on a chip, the transmission of the filter may be angle dependent. The received light intensity then depends on the angle of illumination. Calibration, or equivalently, derivation of the spectral transform then requires a limited or defined field of view. Some methods of limiting or defining the field of view has relied on external diffusers, lenses and aperture. Some companies that have provided such spectrometers include Consumer Physics Scio (Consumer Physics as the SCIO™, see www-.consumerphysics.com). The complexity of the required assembly methods in these systems is undesirable and cost prohibitive for some consumer applications.

Plasmonic filters have also been attempted, for instance by nanoLambda, at the National NanoFab Center, Daejeon, Korea. However, the fabrication of plasmonic filters, which have transmission functions that are sensitive to natural process variation resulting in widely varied spectral shapes, is undesirable for mass manufacturing. In addition, plasmonic filter array transmission, especially for easily manufactured single metal layer designs, can be extremely angle dependent, which limits the light collection and places severe requirements on light diffusion and collimation.

All of these issues add to the cost, size and complexity of the spectrometer, which effectively limits economic deployment in mobile applications. The total (non-image) sensor budget for a typical high end smart phone can be in the $5 range, whereas camera modules are $5-20. Thus, sensors relying on camera-module-like complexity face a challenge for mass deployment in terms of size and cost, as has been evidenced by the fact that mobile spectrometers have existed for several years without mass deployment in consumer handheld devices. Improvements to make the devices more intrinsically stable across process variation are also desired for mass production.

Therefore, there is a need to develop better, more robust and manufacturable spectrometers for use in mobile devices.

SUMMARY

In some embodiments, a spectrometer having a plasmonic filter/microlens arrangement is provided. A spectrometer according to some embodiments can include a controller; a sensor array with a pixel array formed by a plurality of pixels, the pixels being coupled to the controller; and an optical layer over the sensor array, the optical layer including a spacer layer positioned over the sensor array, a plasmonic microlens array including a plurality of microlenses positioned over the spacer layer to focus light on the plurality of pixels, and a plasmonic filter array arranged with the plasmonic microlens array such that light is incident on each of the plurality of pixels in accordance with a transmission function for that pixel, and wherein the transmitted optical spectrum to each pixel in the sensor array varies across the plurality of pixels of the image sensor, wherein the plurality of pixels of the image sensor array pixels selectively receive light from a foci of the plasmonic microlens array through the optical layer and generate the spatially and spectrally filtered signals accessible by the controller.

In some embodiments, the microlens array and the plasmonic filter array are formed as a composite filter-microlens in a single metallic layer. In some embodiments, the composite filter-microlens array can be a plasmonic micro-zone plate structure.

In some embodiments, a limiting aperture is formed in a cover that overlays the optical layer. In some embodiments, the controller is a microcontroller. In some embodiments, the microcontroller uses transfer functions unique to each pixel in the pixel array to calibrate the spectrometer.

These and other embodiments are discussed below with respect to the following figures.

BRIEF DESCRIPTION OF THE FIGURES

FIGS. 9A and 9B illustrate some examples of frequency selective plasmonic filters.

FIGS. 10A and 10B illustrate a portion of the structure illustrated in FIG. 2D with a plurality of filter/lens structures for each pixel.

Figure 1:
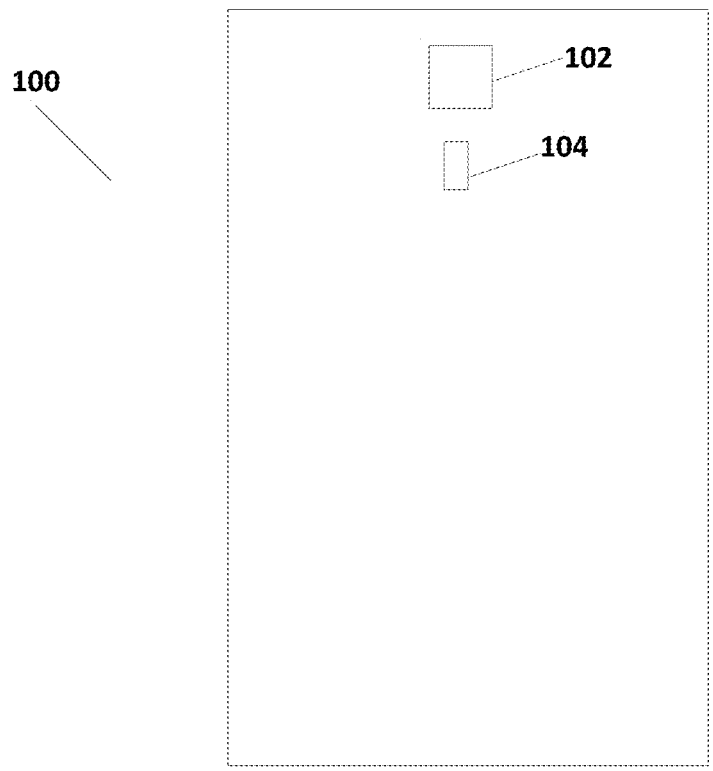
FIG. 1 illustrates a mobile device that incorporates a spectrometer.

These and other aspects of embodiments of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Embodiments of the present invention provide for a spectrometer on a chip with wafer-level optics, providing wavelength-specific focusing that does not require external lenses. A hybrid diffractive lens with plasmonic filter elements offers well-behaved spectral peaks with transmission maxima that are primarily defined by process-controlled lithographic spacing dimensions, rather than by difficult to control nanohole diameters and etch profiles. Wavelength-specific filtering per pixel is possible with light from an advantageously large field of view of 20 degrees or later, a large improvement over typical plasmonic filter designs.

A plasmonic filter refers to a metal film with an array of subwavelength sized holes. Such structures exhibit "Extraordinary Transmission," where some structures exhibit up to 90% transmission at a particular wavelength and a bandwidth that is only a few percent of the designed center wavelength.

The previous focus has been on methods of improving the bandwidth of diffractive lenses, namely trying to make the advantageously thin diffractive lenses more like bulk refractive lenses for broadband visible or infrared light applications. Embodiments of the present invention, going in a different direction, takes advantage of, and enhances, the bandwidth limiting properties of diffractive lenses to cause the desired wavelength to focus and either block or not focus light from other wavelengths. The significance of this deviation from the momentum of prior research cannot be overstated. Nanoplasmonic research has been largely funded by the military. Papers published in this field often demonstrate amazing results for things like wavelength filtering and subwavelength imaging, among other things. However, although it is difficult, if not impossible to find papers addressing the respective deficiencies of off-axis performance degradation and poor bandwidth characteristics. In favor of positive results, there has be a decided neglect of deleterious effects. Some embodiments of the present invention specifically take advantage of those effects.

The concept behind embodiments of the present invention is not to simply filter the light with a plasmonic filter, or focus light with a diffractive lens, but rather to focus the light with a diffractive lens and use the plasmonic filter to narrow the bandwidth enough for spectroscopic applications. The pixel forms an aperture under the diffractive-plasmonic lens filter which simultaneously limits the bandwidth and defines the field of view. A simply constructed, compact housing over the sensor provides a usefully large limiting input aperture.

In some embodiments, a diffractive lens is used, rather than a quasi-homogenous filter such as an interference filter or plasmonic nanohole array. Process variations in the quasi-homogenous filters generate shifts off passbands for both interference filters and nanohole arrays. With diffractive lenses, the lithographically defined spacings set the wavelength. The lithographically defined spacings provide a fundamentally more repeatable approach for mass manufacturing. Furthermore, diffractive lenses are produced with a single layer process, in contrast to multilayer interference filters, which also results in less processing.

In some embodiments, the lens is arranged to be much larger than the pixel in order to provide a spatial filtering effect. Either the pixel has an aperture much smaller than the pixel pitch, or the lens is much larger than the pixel pitch. This arrangement differs from typical cameras that use color filters and microlenses for color separation in imaging, where the primary goal is concentrating light into the active area of a pixel to maximize light collection. Thus, the hybrid diffractive-plasmonic lens spectrometer according to some embodiments is differentiated by a much smaller active area of the sensor (fill factor), reducing light collection in exchange for both spectral and spatial filtering at the wafer level.

In some embodiments, the diffractive rings are formed from plasmonic arrays. This has been done in the past to manufacture a sub-wavelength focusing lens, but this has not been used for wavelength filtering. In fact, efforts have produced lenses that focus multiple wavelengths. The ring spacings limit the interaction length of the surface plasmon polaritons, and while broadening the resonance, serve to limit the angle sensitivity. This effect provides for a spectrometer that has a usefully large input aperture (etendue), offering a clear advantage over nonfocusing nanohole array filters and a clear contrast to etalon-type filters which have strong angle dependence. This modular approach of combining the diffractive lens with the nanohole arrays allows largely independent optimization of the rings and holes, which simplifies the numerical modeling.

In contrast to spectrometers that use arrays of varied nanohole patterns that endeavor to create a usefully large set of spectral basis functions, the hybrid diffractive plasmonic lens filter according to some embodiments can be scaled over a wide range of wavelengths. There is no intrinsic free spectral range limitation such as that faced by etalon filters. The hybrid diffractive plasmonic lens filters according to some embodiments are well-behaved in the sense that they have smooth transmission gradients and do not have significant out of band transmissions. Consequently, hybrid diffractive plasmonic lens filters according to some embodiments are intrinsically simpler to provide for construction of a wavelength transform, meaning fewer elements can be used in manufacturing. Because the manufacturing is more robust, less redundancy may be used, which means a smaller (lower cost and size) pixel array may suffice in practice.

Embodiments of the present invention provide for a sensor array, for instance CCD or CMOS sensor, linear sensor array or array of photodiodes. Embodiments of the sensor array may have a corresponding aperture array that is fabricated or integrated on the array, for instance by photolithography of an array of holes in a vacuum-deposited metal layer. Each photodiode for receiving light has an aperture. In some embodiments, reference "dark pixels" can be formed that have no aperture. These "dark pixels" may be used for calibration purposes.

The purpose of the formed aperture is to act as a spatial light filter. A spacer layer can then be deposited over the aperture array. A composite nano-patterned microlens-filter array is then placed above the aperture array. Light incident on the composite microlens-filter is both spectrally filtered and focused toward the aperture array. The aperture array allows light incident from a defined field of view AND within the filter passband to enter the pixel active area. The composite microlens-filter modulates the light spectral content and focuses it onto the active pixel areas. In the case of very large pixels, a pixel may include more than one aperture. In the case of very small pixels, the pixel active area functions as a spatial filter. An sensor array front side illumination (FSI) top metal, redistribution (RDL) layer or backside illumination metal (BSI) metal layer may be used to pattern the aperture array. Or an aperture array may be added in the backend processing of the filter/microlens stack. The end result is that an external lens is not required to collimate light, vastly simplifying the mechanical requirements for the spectrometer assembly.

Plasmonic filters that modulate the incident light spectrum (e.g. nanoLambda) have been demonstrated. Diffractive or plasmonic filters that focus light onto pixels have also been demonstrated. In one example a diffractive microlens is used. Further, plasmonic microlenses have been demonstrated. However, the spectrometer on a chip according to embodiments of the present invention use a variety of spectral basis functions, so mere focusing is not sufficient. The spectral transfer function in embodiments of the present invention varies from pixel to pixel based on a deterministic variation of the filter design. Neither a plasmonic filter array (no lensing) nor a microlens array (unvaried filtering) meets both of these conditions. Embodiments of the present invention solve this problem with the prior art by providing a hybrid diffractive plasmonic lens that both focuses light and spectrally filters it in a varied way. Each microlens-filter has a defined input aperture centered over an open aperture.

A spectrometer is formed by an array of pixels. A pixel under a microlens itself is a spatial filter because its input aperture defines the region that receives light. However, in some embodiments the spectrometer may use filters performing optically with fields of view smaller than an image sensor would typically provide. In this case, reduction of the pixel aperture is can be provided, but the ratio of the pixel size and aperture size is somewhat immaterial to the functioning of the spectrometer on a chip. What matters is the ratio of the microlens-filter input aperture to the size of the aperture. In an example embodiment, the microlens-filter aperture can be 25 um in diameter and the aperture can be 3 um and the spacer is a 12 um thick polymer such as a polyimide, PMMA (poly methylmethacrylate) or BCB benzocyclobutene). The pixel itself may be only a few microns larger than the aperture to collect light entering the aperture in the allowed range of angles. The useful pixel pitch is dictated by the larger microlens size, which in this particular example is 25 um. This is clearly different than a typical image sensor where a high fill factor is desired. Namely the active region of the pixel should fill as much area of the pixel as possible so that the pixel size and pixel pitch are comparable. Pixel fill factors of 20-90% are typical. Pixel fill factors of <10% are not typical, but may be useful for a spectrometer-on-a-chip with the described wafer level optical control.

Combining a microlens array and plasmonic filter array as provided for in embodiments of the present invention is a large improvement over previous designs. Such an arrangement has not been proposed by manufacturers, for example Scio and nanoLambda, even though these improvements remove the requirements of adding expensive external optics to the devices.

Embodiments of the present invention involve combining the previously disparate functions (filtering and focusion) onto the sensor array itself. In some embodiments, a modulation of refractive index in a radial direction with the spatial modulation increasing in frequency (smaller pitch) away from the center can be provided. This provides for a positive focal length diffractive optical element.

In some embodiments, a sub-wavelength modulation in a nonradial way is provided, which imparts higher order modulations on the spectral transfer function. An example is concentric rings of nanoholes. Examples of this structure include concentric gear shapes, with subwavelength cog features. Another example is a plasmonic filter nanohole array in a metal with radially varied pitch and hole shapes. A further example includes a multi-layer structure in which one layer is optimized to provide more spectral filtering and the second layer provides more focusing. This design can have advantages for breaking engineering constraints associated with trying to do both filtering and focusing in a single layer. In such a case it should be noted that the focusing element should be under the filter. Otherwise the microlens layer will send a converging beam to a more uniform array better suited to a plane wave excitation.

FIG. 1 illustrates a mobile device 100, for example a smart phone or tablet, that can include a spectrometer 104 according to some embodiments of the present invention. Mobile device 100 includes an integrated system of processors, circuitry, and user interfaces to provide services to a user of mobile device 100. Such services can include, for example, internet services, cell phone services, data storage, and other common functions of such a device. In addition, mobile device 100 includes a camera 102, which can be used for various photographic purposes. Additionally, in some implementations, mobile device 100 includes spectrometer 104. Spectrometer 104 is coupled to the processor of mobile device 100 and, under the control of mobile device 100, can take spectroscopic data and analyze the spectroscopic data acquired.

As discussed above, the spectroscopic data can be used in the processing of photographs taken by camera 102 and may further be used to determine the chemical composition of target substances. From the spectroscopic data, the quality and ripeness of fruits and vegetables can be determined, along with the composition of other substances. Furthermore, the target may be biological, and the spectroscopic data used to measure various health conditions. Consequently, having a handheld accurate spectrometer, such as that built into mobile device 100, can be a very valuable tool not just for scientific purposes, but also for more utilitarian purposes such as health monitoring, environmental monitoring, counterfeit detection and authenticity confirmation, product ID, color search and color matching, and other uses.

Figure 2A:
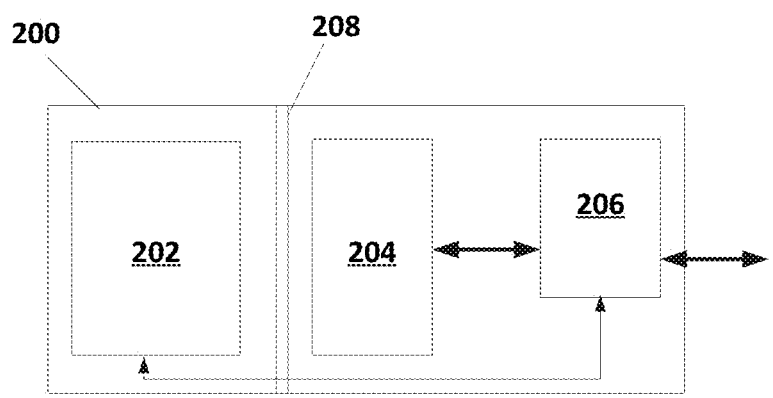
FIGS. 2A, 2B, 2C, 2D, 2E, and 2F illustrate a spectrometer on a chip according to some embodiments that can be used in the mobile device illustrated in FIG. 1.

FIG. 2A illustrates a block diagram of a spectrometer 200 that can be used as spectrometer 104 in mobile device 100. As illustrated in FIG. 2A, spectrometer 104 can include a light source 202, a sensor array 204, and processing circuitry 206. Light source 202 can be any source of light used by the spectrometer, including one or more LEDs for producing near IR light for example. In some embodiments, light source 202 can be an array of LEDs. In some embodiments, the array of LEDs can be dual junction LEDs where the junctions have different emission wavelengths, which can result in provided a broader range of wavelengths in a smaller form factor. In some embodiments, light source 202 can be a flash having an array of LEDs of varied wavelengths. In some embodiments, light source 202 can be a phosphor-converted LED flash. In some embodiments, light source 202 may be the flash of camera 102.

Sensor array 204 can be any type of sensor array capable of measuring a spectral range of light that is appropriate to the purpose of spectrometer 104. For example, sensor array 204 can be a CMOS device having an array of individual pixels or other array of light sensitive areas that produce electrical signals that can be further processed. In some embodiments, sensor array 204 detects wavelengths in the visible range, near IR, or UV. In some embodiments, sensor array 204 detects wavelengths less than about 1100 nanometers. In some embodiments, sensor array 204 detects wavelengths less than about 2.5 microns. Processing circuitry 206 can include pixel reading circuitry and pixel driving circuitry as well as controllers or processors, including microprocessors and microcomputers, for receiving data from sensor array 204, processing that data, and providing the data to the microprocessors in mobile device 100 for further analysis and display to the user.

Processing circuitry 206 may also control the intensity and duration of light produced by light source 202, which may be pulsed or continuous, and may gate sensor array 204 accordingly. In some embodiments, a pulse of light of a particular duration may be produced by light source 202 followed by a data acquisition period where sensor array 204 receives the incoming light and accumulates a charge or voltage related to the intensity of light received. Processing circuitry 206, after some acquisition period, then reads integrated values of light received by the pixel array in sensor array 204. In some embodiments, a decay process may be monitored by periodically sampling the integrated values in order to determine the light received as a function of time. In some embodiments, light source 202 may be a camera flash, which can then be controlled by processing circuitry either directly or through microprocessors or microcomputers in the host device such as mobile device 100.

As is further illustrated in FIG. 2A, light source 202, sensor array 204, and processing circuitry 206 can be packaged on a wafer chip 208. In some embodiments, a structure 210 separates sensor array 204 from light source 202 to prevent light produced by light source 202 from directly entering sensor array 204.

Figure 2B:
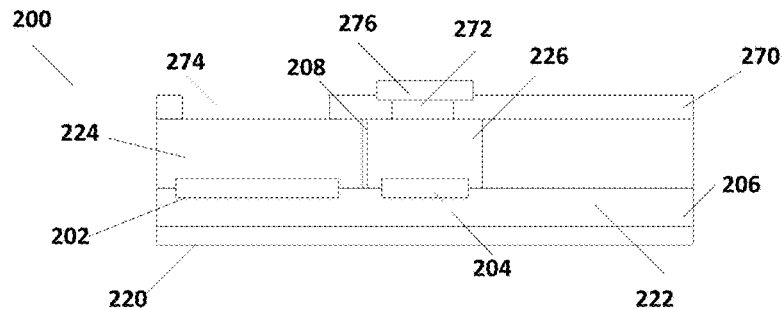

FIG. 2B illustrates a cross-sectional view of an embodiment of a spectrometer 200. As is illustrated in FIG. 2B, spectrometer 200 can be formed on a wafer substrate 220. As is further illustrated in FIG. 2B, a semiconductor layer 206 is formed on substrate 220, where the silicon components of processing circuitry 206 is formed as well as circuitry for driving light source 202 and sensor array 204. Sensor array 204 and light source 202 are formed in or on semiconductor layer 222. As is further illustrated, an optically transparent layer 224 is provided over light source 202. Optically transparent layer 224 may further include some optics, for example lensing structures, filter structures, or other optical structures, for transmitting light from light source 202 for irradiating a target substance. Optically transparent layer 224 may be an air gap. Layer 226 is also an optical layer that, in some embodiments, provides focusing, filtering, and dispersion functions to direct light received at layer 226 onto individual pixels of sensor array 204. In some implementations, especially in previously developed systems, some external optics may be provided external to spectrometer chip 104 to provide focusing, filtering, and other functions. However, in embodiments of the present invention, layer 226 includes the optics that filter and focus incoming light from the target sample. In embodiments that use a camera flash instead of light source 202, spectrometer 200 may be smaller and only include sensor array 204 and supporting circuitry.

As is further illustrated in FIG. 2B, a cover 270 is placed on optically transparent layer 224 and optically transparent layer 226. Cover 270 may be a hard protected cover, for example formed of plastic, which may be formed to encapsulate spectrometer 200. A limiting aperture 272 can be formed on cover 270 over sensor array 204. Limiting aperture 272 provides light access, similar to the functioning of a pinhole in a pin-hole camera, to sensor array 204 and controls the light access to limiting aperture 272. In some embodiments, limiting aperture 272 can be circular and admit light in a range of angles limited to about twenty degrees. High angle rays can have the effect of washing out the spectral features at the focus, so it is useful to block unnecessary light. The size of the opening scales with the height of the cover. An additional opening 274 is formed in cover 270 in order to allow light from light source 202 to exit spectrometer 200. If cover 270 is close to the sensor array 204, a diffuser 276 can be placed above the aperture 272 to improve the homogeneity of the light across the sensor array 204. For pixels away from the center of sensor array 204, the limiting aperture 272 can be off axis, so the positions and optionally the focal lengths of the microlenses of layer 226 can be adjusted to direct the light from the limiting aperture 272 to pixels of sensor array 204. In an example the height of the cover over sensor array 204 is 2 mm and the diameter of aperture 272 is 500 microns. A diffuser 276 may be a thin layer of polytetrafluoroethylene (PTFE) or ground glass attached to the outside of the cover.

Figure 2C:
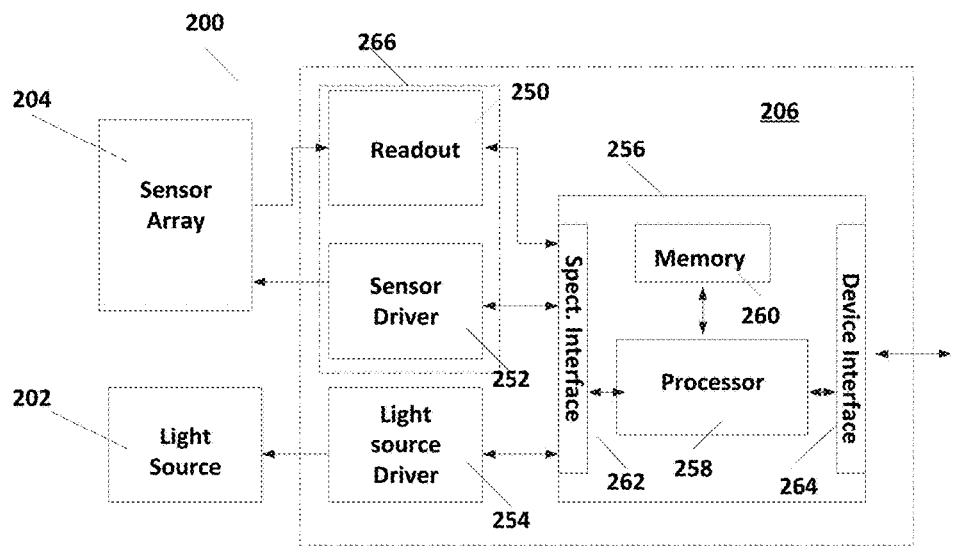

FIG. 2C illustrates a circuit diagram of spectrometer 200. As illustrated in FIG. 2C, processing circuitry 206 includes a controller 256. Controller 256 can be any controlling circuit, including a microcontroller unit, a microcomputer, dedicated circuitry, or other device. Controller 256 may be dedicated circuitry, processors operated by a state machine, or any other device that is capable of receiving data from readout 250 and controlling sensor driver 252 and light source driver 254.

In some embodiments, controller 256 can interface with an external programmable device such as a microcontroller (MCU) or application processor (AP). In addition, controller 256 may interface with processors of mobile device 100, and therefore is controlled by instructions stored in mobile device 100.

As illustrated in FIG. 2C, in some embodiments controller 256 may itself be a microcontroller unit (MCU) 256 that can be interfaced to external processors in mobile device 100. MCU 256 includes a processor 258, memory 260, and interfaces 262 and 264. Memory 260 can include both volatile and non-volatile memory and as such may store instructions executed by processor 258 and data used in the processing of data in spectrometer 200. Processor 258 can also be coupled to a device interface 264 to interface with a mobile device such as other processors in mobile device 100. Processor 258 is also coupled to a spectrometer interface 262, through which processor 258 communicates with a light source driver 254, and sensor circuitry 266, which includes a sensor driver 252 and a readout 250.

Light source driver 254 is coupled to drive light source 202 at the direction of MCU 256. Sensor driver 252 is coupled to drive light sensor elements of sensor array 204, in particular to provide power and control signals to sensor array 204. MCU 256 is also coupled to readout 250, which is coupled to receive signals from each of the active areas (pixels) of sensor array 204. Readout 250 can include analog filtering, amplification, integration, and digitization of signals received from light sensor elements of sensor array 204. In some embodiments, readout 250 may include analog integrators that integrate over time periods set by programming in microprocessor 256 the current signals received from sensor array 204. In embodiments where light source 202 is the flash from a camera, light source driver 254 can provide a signal to a supporting device that drives the camera flash accordingly.

Figure 2D:
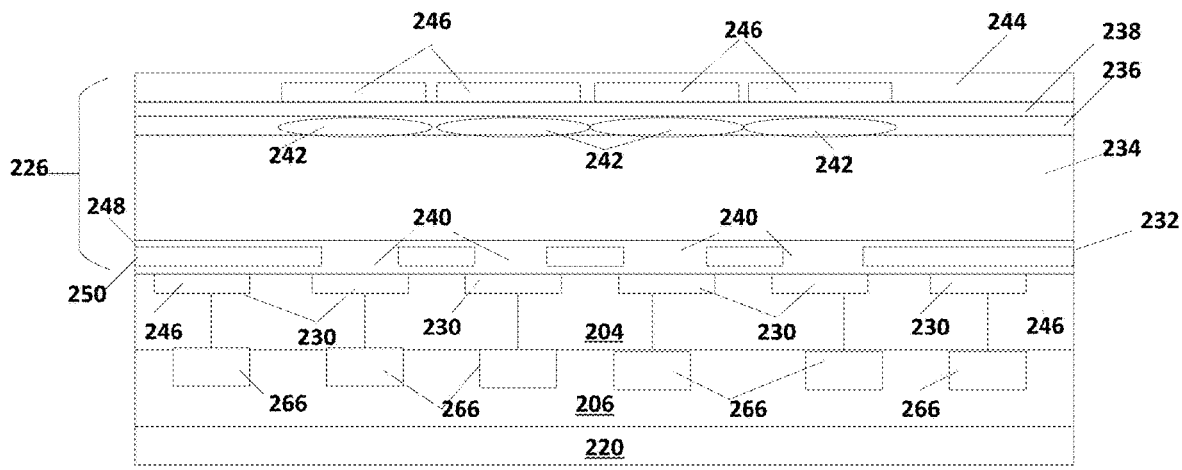

FIG. 2D illustrates a cross section of sensor array 204 and layer 226 according to some embodiments of the present invention. In some embodiments of the present invention, sensor array 204 is, for example, a CCD or CMOS sensor, linear sensor array or array of photodiodes, having active pixels 230. Pixels 230 are each coupled to sensor circuit 266. Pixels 230 are the optically active areas of sensor array 204 and provide electrical signals, which as shown in FIG. 2D are each coupled to interface circuit 266 that includes readout 250, according to the intensity of light incident on pixel 230. Sensor array 204 may include any number of pixels 230. For example, there may be between 100 to 1000 pixels.

The active surface of pixels 230 have a particular shape of the light receiving area. This may be defined by an opaque mask or by the dimensions of the photodiode absorbing region. A mask or aperture may be circular with a particular diameter, and pixels 230 have a particular pitch (distance between adjacent pixels 230). If there is no mask, the diameter of the pixel would refer to a distance across the pixel light receiving area. In some embodiments of the present invention, pixels 230 may have a diameter of about 10 μm or less and the pitch may be about twice the diameter of pixel 230 or less. In some embodiments, the pitch may be greater than twice the diameter of the pixels 230. Pixels 230 can be arranged in any fashion, but often will be arranged along an x and y axis (with the z direction being perpendicular to the surface of sensor array 204) with particular pitches in the x direction and the y direction. Although the pitch in the x direction and the y direction may be different, often they are arranged to be similar or the same. In some embodiments, for example, the pixel pitch can be greater than 15 microns. In some embodiments, greater than 20 microns. In some embodiments, the square root of the area of aperture 240 is less than one fourth of the pitch of pixels 230.

As shown in FIG. 2D, in some embodiments layer 226 is composed of multiple layers. The multiple layers can include, for example, an aperture array layer 232, a spacer layer 234, a microlens array 236, and a filter layer 244. In some embodiments, as is discussed further below, microlens array 236 and filter layer 244 may be combined in a single consolidated plasmonic device. In either case, filter layer 244 and microlens array 236 are incorporated together to form a hybrid plasmonic device that filters and focuses light through apertures 240 onto pixels 230. In some embodiments, as is illustrated in FIG. 2D, each filter array 244 and microlens array 236 construction directs light to a single one of pixels 230. However, in some embodiments, light incident on one of pixels 230 may be provided by a plurality of filter array 244 and microlens array 236 constructions. In some embodiments, for example, light from a plurality of microlenses 242 may be incident on a single one of pixels 230.

Layer 226 includes an aperture array 232, which is fabricated on or integrated with sensor array 204. In some embodiments, aperture array 232 may be formed on, or encapsulated in, an optical layer (e.g. a dielectric layer) formed over sensor array 204. FIG. 2D illustrates an aperture array 232 with a metal layer 250 embedded in an optically transparent layer 248 deposited over sensor array 204.

Aperture array 232 can be formed in a metal layer 250 deposited by vacuum deposition over sensor array 204 (e.g. either directly on sensor array 204 or on a film deposited on sensor array 204). An array of apertures 240 can be formed in metal layer 250 by photolithography techniques. As illustrated in FIG. 2D, an aperture 240 can be formed over pixels 230 such that active pixels 230 for receiving light each has an aperture 240 formed over them in the aperture array 232. Reference "dark pixels" 246 (which do not receive any light) can be formed of an individual light collecting pixel elements 230 of sensor array 204 that has no corresponding aperture 240 formed in the aperture array 232 in layer 226. As is discussed in more detail below, apertures 240 in aperture array 232 act as a spatial light filter. Each of apertures 240 is typically smaller than the corresponding pixel 230 over which it is formed and has the same pitch as does the pitch of pixels 230 in sensor array 204.

In some embodiments, aperture layer 232 uses the apertures of pixels 230 themselves. In which case, aperture layer 232 can be absent from layer 226. The aperture of a pixel 230 may be 5-15 times smaller than the diameter of microlenses 242, for example.

As is further illustrated in FIG. 2D, a spacer layer 234 can be deposited over aperture array 234. Spacer layer 234 is optically transparent and can be used to provide spacing between aperture array 232 and a microlens array 236. The thickness of spacer layer 234 is determined by the focal length of lenses 242 in microlens array 236. In some embodiments, the thickness of spacer array 234 can be from about 5 µm to about 50 µm. This spacer may include dielectrical layers of the sensor array from front end fab processes, and polymer layers added in back end processing.

Microlens array 236 can be formed in a metallic layer where each microlens 242 is formed by pinholes in the metallic layer. Each individual microlens 242 in microlens array 236 can be formed in a metal layer having radially varied phase elements with apertures (or pinholes) of varied shape and size. Individual microlenses 242 have a wavelength-dependent focal length that is adjusted to focus light through apertures 240 onto specific pixels 230. The focal length of each microlens 242 can be adjusted for the thickness of spacer layer 234.

In the example illustrated in FIG. 2D, a planarization layer 238 is formed over microlens array 236 and a filter array 244 having individual filters 246 provided over each microlens 242 is provided. Filter array 244 can also be a plasmonic filter formed by arranging apertures in a metallic sheet. The thickness of planarization layer 238, in some embodiments, has a thickness greater than the thickness of the detectable wavelength range.

As illustrated in FIG. 2D, incident light is filtered in filter 246 and focused by microlens 242 onto an individual pixel 230 or aperture above a pixel 230. By adjusting the filter characteristics of filters 246 for individual pixels, and consequently that of the corresponding microlens 242, multiple channels of wavelengths can be detected by the spectrometer in order to provide a spectrum to controller 256 for analysis.

In particular, filters 246 and microlens 242 can be formed such that a number of individual channels are formed with individual pixels 230, each of these combinations arranged to have particular transfer functions (which describe the transport of wavelength components of the incident light onto individual ones of pixels 230). Microlens 242 and filters 246 can have multiple designs, each corresponding to the particular transfer functions of an individual channel. Multiple ones of pixels 230 can receive the same channel. In particular, there may be any number of individual channels (or any number of microlens 242 and filter 246 designs), in some embodiments greater than 20.

In some embodiments, microlens array 236 and filter array 244 can be combined into a composite nano-patterned microlens array that can be formed in layer 226 above aperture array 236. Light incident on the composite microlens-filter in microlens array 236 and 244 is focused toward aperture array 232. Aperture array 232 allows light incident from a defined field of view and which falls within the filter passband of aperture array 232 to enter the active area pixels 230 of sensor array 204. As such, in some embodiments a diameter of apertures 240 in aperture array 232 can be less than a multiple of the diameter of the corresponding microlens 242, for example where the multiple is a factor of five (5). Composite microlens-filter of microlens array 236 and 234 both modulates the light spectral content and focuses that content onto pixels of sensor array 204. In some embodiments, cover layer 270 may be deposited over the composite microlens array 236 and filter array 244. In some embodiments, each pixel may include a plurality of identical composite microlens-filters providing light for each pixel 230.

Figure 2E:
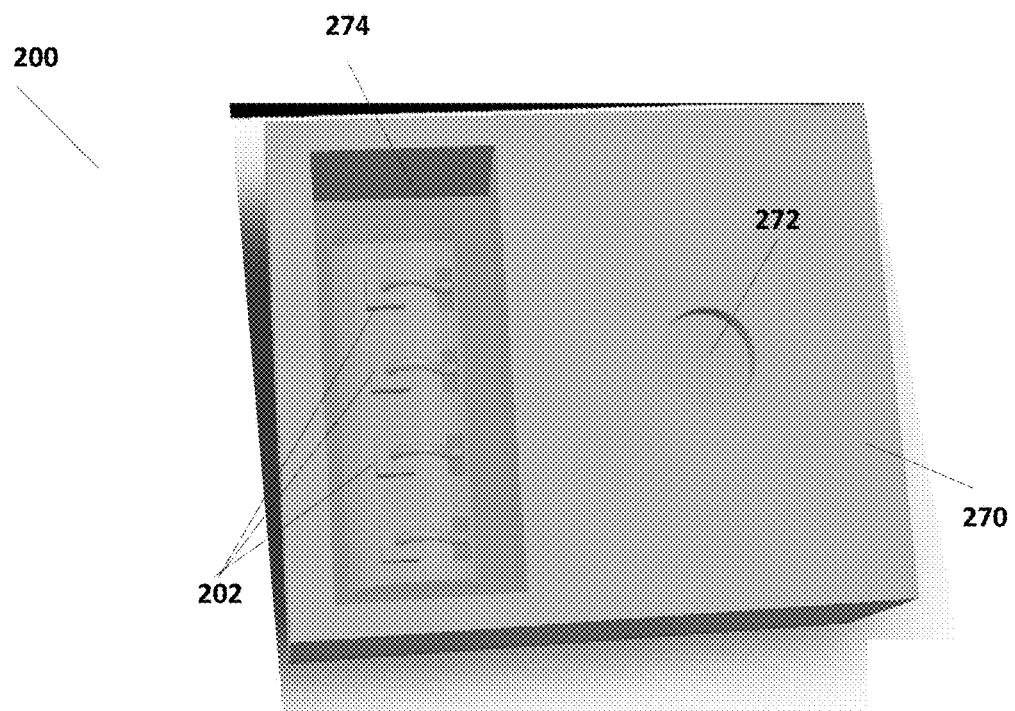
Figure 2F:
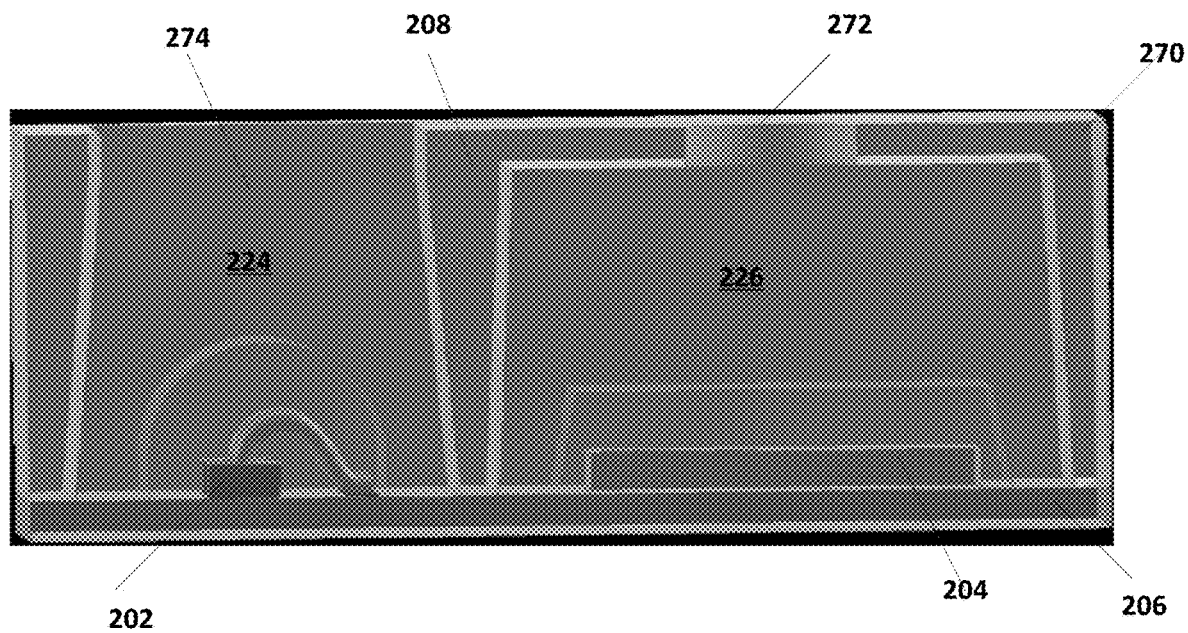

FIG. 2E illustrates a perspective view of a spectrometer 200 according to some embodiments. As illustrated in FIG. 2E, opening 274 in cover 270 reveals an array of LEDs that form light source 202. Further, limiting aperture 272, which is formed over sensor array 204, is illustrated. FIG. 2F illustrates a cross-section view of the example spectrometer 200 illustrated in FIG. 2E. As illustrated in FIG. 2F, opening 274 is over light source 202. Limiting aperture 272, formed in cover 270, is over sensor array 204.

Spectrometers based on arrays of filters, with each pixel of the sensor array having an independent filter, have been developed and incorporated within mobile devices. In an example, in one such device layer includes a variety of filters deposited over an image sensor array. The intensity of light received on each pixel of image sensor array is determined by the passband of the filter over that respective pixel. The received pattern of light may be transformed to a wavelength basis representation of the light intensity by a linear transformation based on the signal received from each pixel in sensor array.

However, with this type of filter-based spectrometer on a chip, the transmission characteristics of each of the filters may be angle dependent, and the angle dependency may itself by wavelength dependent. The received light intensity received in each pixel then depends on the angle of illumination. Calibration, or equivalently derivation of the spectral transform, then requires a limited or defined field of view. Previous methods of limiting or defining the field of view have relied on external diffusers, lenses, and aperture. Such a spectroscopic device is offered, for example, by Consumer Physics as the SCIO™ (see www.consumerphysics.com).

Some previous designs have demonstrated examples where plasmonic filters are used and where the incident light spectrum is modulated. Such a device, for example, is offered by nanoLambda, which is a part of the National NanoFab Center, Daejeon, Korea. Other solutions have also demonstrated diffractive or plasmonic filters that focus light onto individual pixels of an image sensor array. In one such example, a diffractive microlens is used. Panasonic Press Release entitled "Panasonic Develops Technology for Highly Sensitive Image Sensors Using Micro Color Splitters," data Feb. 4, 2013, https://news.panasoinc.com/global/press/data/2013/02/en130204-6/en130204-6.html. A diffractive microlens has linear chromatic dispersion. The focal length varies inversely with the wavelength. Red light focuses strongly, green light less strongly and blue light only weakly. This has been used to partially separate colors into subpixels for color imaging.

Plasmonic microlenses have also been demonstrated in some systems. However, the spectrometer on a chip should use a variety of spectral basis functions. Consequently, mere focusing is not sufficient. The spectral transfer function should vary from pixel to pixel based on a deterministic variation of the filter design. Neither a plasmonic filter array (no lensing) nor a microlens array (unvaried filtering) meet both of these conditions.

Several papers have described microlens arrays or plasmonic filters. For example, Yiting Yu, Ping Want, Ychuan Zhu and Jinshuai Diao, "Broadband Metallic Planar Microlenses in an Array: the Focusing Coupling Effect," Nanoscale Research Letters 2016 11:109 (Feb. 27, 2016), which can be found at https://nanoscalereslett.springeropen.com/articles/10.1186/s11671-016-1333-9 (the "Yu paper") describes a microlens array. The Yu paper microlens array includes large-scale array of nanholes having periodicity P formed between a first gold layer of thickness t1 and a second gold layer of thickness t2. The second gold layer defines a lens aperture of diameter d. The microlens array is formed on a glass substrate. The paper describes the transmission function with d=4 µm and the periodicity P ranging from 400 nm to 600 nm. As described in the Yu paper, the focal point depends on both the periodicity P and the wavelength λ of the incident light. Sumit Saxena, Raghvendra Pratap Chaudhary, Abhay Singh, Saurabh Awasthi, and Shobha Shukla, "Plasmonic Micro Lens for Extraordinary Transmission of Broadband Light," Scientific Reports 4, Article Number: 5586 (2014), which can be found at https://www.nature.com/articles/srep05586 (the "Saxena paper") also describes a microlens array where the focal lens varies with wavelength of the incident light.

An example plasmonic filter array is described in Woo-Yong Jang, Zhyun Ku, Jiyeon Jeon, Jun Oh Kim, Sang Jun Lee, James Park, Michael J. Noyola, and Augustine Urbas, "Experimental Demonstration of Adaptive Infrared Multi-spectral Imaging Using Plasmonic Filter Array," *Scientific Reports* 6, Article number: 34876 (2016), provided at https://www.nature.com/articles/srep34876 (the "Jang paper"). The Jang paper describes a gold layer with an array of holes formed on a GaAs layer. The holes have a uniform pitch p in both the X and Y directions, and as described in the Jang paper varies from 2.0 to 3.2 μm. The ratio of d/p (the diameter d of holes 506 to the pitch p) was fixed at 0.5 and the thickness of the gold layer was fixed at 100 nm.

Another microlenses structure is discussed in Yongqi Fu, Jun Wang and Daohua Zhang, "Plasmonic Lenses," *Plasmonics-Principles and Applications*, Chapter 8, Intech (2012), which can be found at https://cdn.intechopen.com/pdfs-wm/40334.pdf (the "Fu Chapter") and Yongqi Fu, Xiuli Zhou, Yu Liu, "Ultra-Enhanced Lasing Effect of Plasmonic Lens Structured With Elliptical Nanopinholes Distributed in Variant Periods," *Plasmonics*, 5 (2), 111-116 (2010) and in Zhenkui Shi, Yongqi Fu, Xiuli Zhou, Shaoli Zhu, "Polarization Effect on Focusing of a Plasmonic Lens Structured With Radialized and Chirped Elliptical Nanopinholes, *Plasmonics* 5(2), 175-182 (2010). The focusing structure with focal length f is formed by a gold film with elliptical pinholes having different sizes distributed in different rings with differing periods. The focal point can be controlled by the size and distribution of the pinholes.

A multi-focusing metalens 700 is described in Wei Wang, Zhongyi Guo, Keya Zhou, Yongxuan Sun, Fei shen, Yan Li, Shiliang Qu, and Shutian Liu, "Polarization-Independent Longiduinal Multi-Focusing Metalens," *Optics Express* vol. 23, No. 23 (2015), which can be found a thttps://www.osa-publishing.org/oe/abstract.cfm?uri=oe-23-23-29855 (the "Wang Paper"). The Wang Paper describes a metalens that includes L-shaped nanoholes arranged in a partitioned sequence. As a result, different focal points result from the nanoholes arranged in different partitions. Focal points from different areas of pinholes result. Furthermore, a phase shift as a function of radius for the different focal lengths is described.

As discussed above, embodiments of the present invention include a filter array that both focuses light and spectrally filters it in a varied way. Each microlens and filter in these systems has a defined input aperture centered over an open aperture, as illustrated in FIG. 2D. Embodiments of the present invention resolve the light into many spectral basis functions, and do not simply resolve light into a few colors (see FIGS. 8A and 8B, discussed further below). Therefore, the filter and lens combination used in embodiments of the present invention modulate the light by more than the chromatic dispersion factor intrinsic to a diffractive optical element (DOE), e.g. a Fresnel Zone Plate or lens design. Furthermore, that modulation is varied over the pixels 230 in sensor array 204 to obtain a variety of spectral shapes at the focus.

As discussed above with regard to FIGS. 2A, 2B, 2C, and 2D spectrometer 200 according to the present invention includes a light source 202, a sensor array 204, and processing circuitry 206. Sensor array 204, as is shown in FIG. 2C, includes pixels 230. Sensor array 204 is covered by a layer 226, which as discussed above includes an aperture layer 232, a spacer layer 234, a microlens layer 236, and a filter layer 244.

In one sense, a pixel 230 under a microlens 242 is itself a spatial filter because the input aperture of pixel 230 defines the region that receives light. However, embodiments of the present invention may use filters performing optically with fields of view smaller than a sensor array 204 would typically require. The field-of-view of spectrometer 200 is further discussed below with respect to FIG. 13. In embodiments of the present invention, reduction of the aperture of pixel 230 may be affected. But the ratio of the size of pixel 230 to the size of aperture 240 is somewhat immaterial to the functioning of the spectrometer on a chip. However, the ratio of the microlens 242 and filter 246 input aperture to the size of aperture 240 may be relevant. In one example, the microlens 242 and filter 246 aperture can be characterized as the lateral extent of microlenses 242 can be about 12 μm in diameter and aperture 240 can have a lateral extent of about 3 μm in diameter. Spacer layer 234 can be a 12 μm thick polymer such as a polyimide, PMMA (poly methylmethacrylate) or BCB benzocyclobutene). Pixel 230 itself may be only a few microns larger than the size of apertures 240, such as is needed to collect light entering the aperture in the allowed range of angles. However, the useful pitch of pixel 230 may be dictated by the lateral size of microlens 242, which in this example is 12 μm. In some embodiments, microlens 242 can be between 5-50 μm in diameter and aperture 240 can be 0.5 to 5 μm in diameter.

Embodiments of the present invention are clearly different than typical image sensors where a high fill factor is desired. Namely in typical image sensors, the active region of the pixels should fill as much area of the pixel as possible so that the size of pixel and the pixel pitch are comparable. In some embodiments according to the present invention, pixel fill factors of 20-90%, which is determined by comparing the lateral size of aperture 240 with the lateral size of pixels 230, are typical. Pixel fill factors of <10% are not typical, but may be useful for a spectrometer-on-a-chip with the described wafer level optical control.

Combining a microlens array 236 and plasmonic filter array 238 can provide large improvement over typical systems. If such a solution was easily conceived vendors like Consumer Physics and nanoLambda would not go to the trouble of adding expensive external optics to their devices to make them operate. The combining of these previously disparate functions requires expertise in nanoplasmonic design, although there are many ways to accomplish the focusing. In general, there should be a modulation of refractive index in a radial direction with the spatial modulation increasing in frequency (smaller pitch) away from the center, as is done in a positive focal length diffractive optical element.

However, there should also be sub-wavelength modulation in a nonradial way which imparts higher order modulations on the spectral transfer function. An example is found in a structure with concentric rings of nanoholes. Another example is a structure exhibiting concentric gear shapes, with subwavelength cog features. Another example is a plasmonic filter nanohole array in a metal with radially varied pitch and hole shapes.

Another example is a multi-layer structure in which one layer is optimized to provide more spectral filtering and the second layer provides more focusing. This design, has advantages for breaking engineering constraints associated with trying to do both filtering and focusing in a single layer.

In such a case it should be noted that the focusing element should be under the filter as illustrated in FIG. 2D. Otherwise the microlens layer will send a converging beam to a more uniform array better suited to a plane wave excitation.

As illustrated in FIG. 2D, for example, spectrometer 200 according to some embodiments is based on an array of pixels 230. Each pixel in the array of pixels 230 can receive a unique transmission function. The transmission functions can be recorded at wafer level during testing in the automatic testing equipment (ATE) used to test the wafer of spectrometer 200 as a function of wavelength. A transform according to the transmission functions is calculated as an inverse matrix, converting the pixel values into spectral values. This transform can be stored in memory 260 in the controller 256 or in the cloud and affiliated with the controller 256 by a unique device ID code stored in nonvolatile memory of memory 260, or can be included in an MCU or AP coupled to controller 256. Controller 256, or other processing device coupled to controller 256, can then retrieve the transform through a mobile device in which it is used.

Figure 3A:
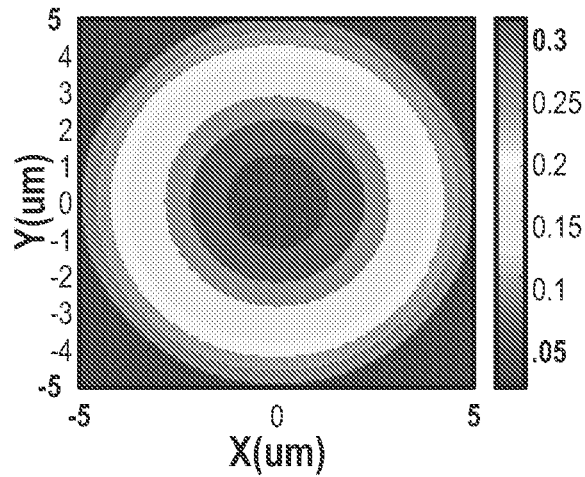
FIGS. 3A, 3B, 3C, and 3D illustrate transmission of light through a pinhole.
Figure 3B:
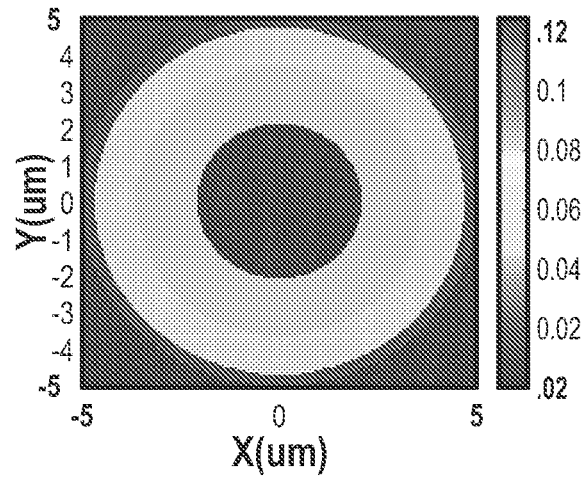
Figure 3C:
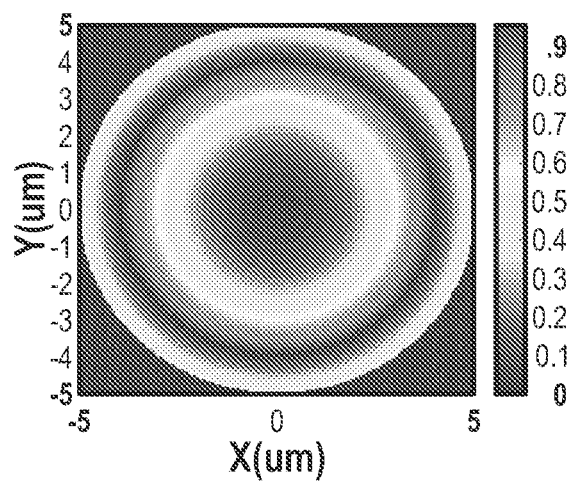
Figure 3D:
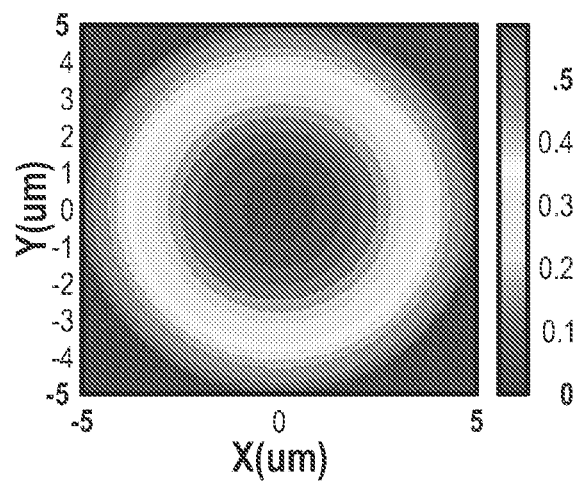

FIGS. 3A through 3D illustrate the diffractive component of light transmission through a pinhole. FIGS. 3A and 3B illustrate diffraction with incident light at 390 nm and 1050 nm, respectively, through a pinhole with a focal number F/#=1. FIGS. 3C and 3D illustrate the diffraction pattern with incident light of wavelength 390 nm and 1050 nm, respectively, through a pinhole with a focal number F/#=0.2. The focal number indicates the ration between the pinhole diameter and the focal length.

Figure 4A:
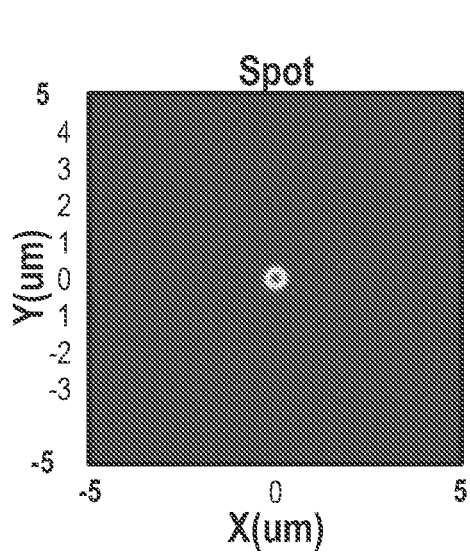
FIGS. 4A, 4B, 4C, 4D, 4E, 4F, 4G, and 4H illustrate focus cross section through a pinhole under various conditions.
Figure 4B:
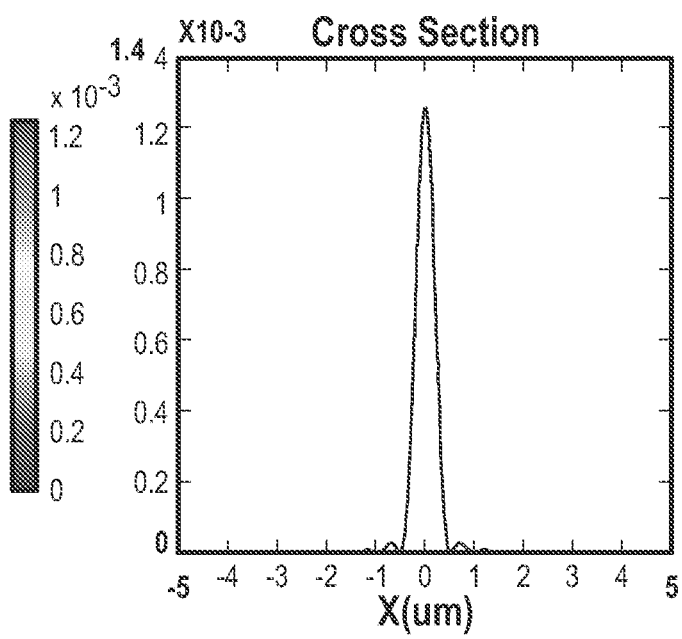
Figure 4C:
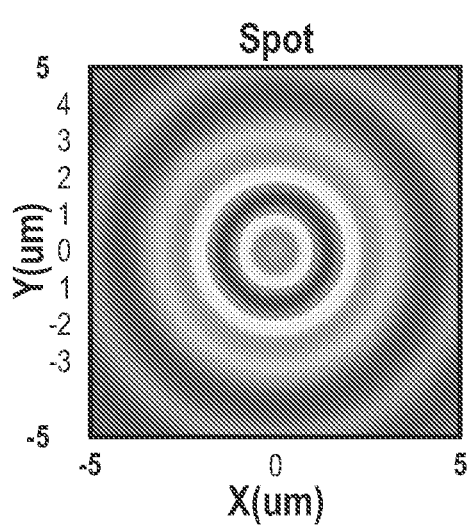
Figure 4D:
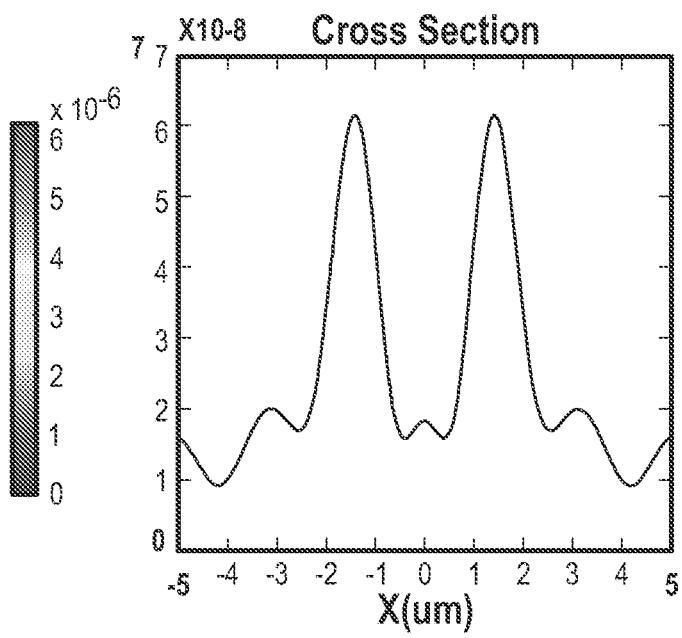
Figure 4E:
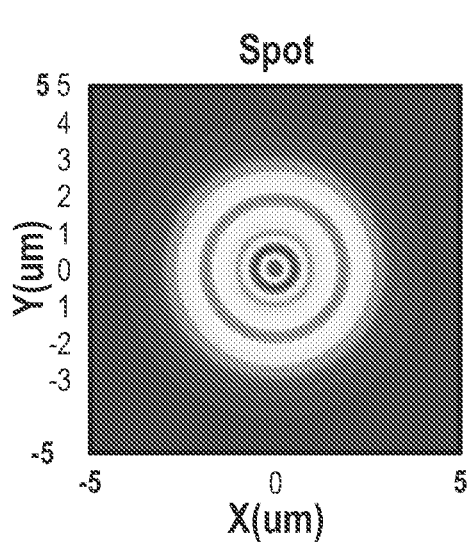
Figure 4F:
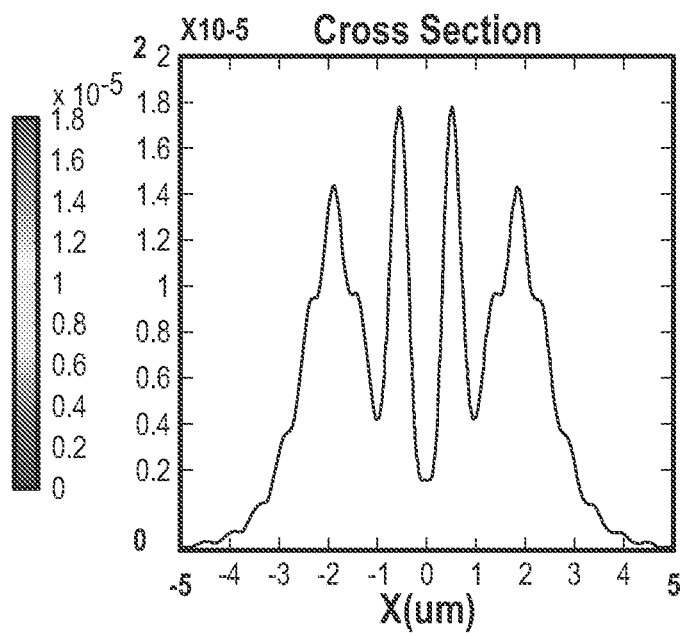
Figure 4G:
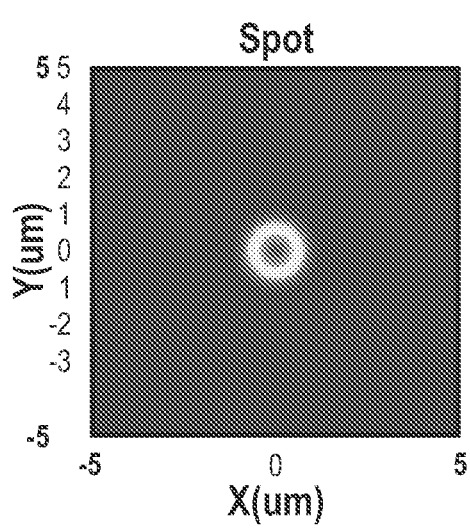
Figure 4H:
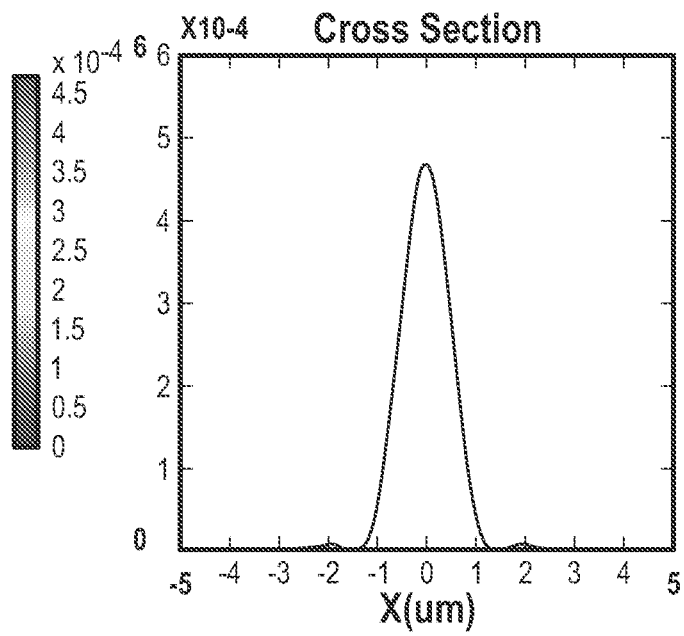

A fast-Fourier Transform based diffraction integral (FFT-DI) method can be used to calculate the diffraction integral. See Fabin Shen and Anbo Wang, "Fast-Fourier-Transform Based Numerical Integration Method for the Rayleigh-Sommerfeld Diffraction Formula," Appl. Opt. 45, 1102-1110 (2006). FIGS. 4A through 4H illustrate the intensity cross section of light transmission through a pinhole array with 2049×2049 samples with in a 10 µm diameter and focal number F/1. FIGS. 4A and 4B illustrates the transmission and cross section for a wavelength of 390 nm with a 390 nm focal length. FIGS. 4C and 4D illustrate the transmission and cross section for a wavelength of 1050 nm with a 390 nm focal length. FIGS. 4C and 4D illustrate the transmission and cross section for a wavelength of 390 nm with a 1050 nm focal length. FIGS. 4E and 4F illustrate the transmission and cross section for a wavelength of 1050 nm with a 1050 nm focal length.

In accordance with embodiments of the present invention, filters and microlenses can be formed with arrays of nano-pinholes, each with diameters d that are less than half the wavelength ($d<\lambda/2$). Grating type structures allow the radiation to couple with surface plasmons. The coupling occurs when the surface plasmon wavevector equals $2\pi/a_0$, where $a_0$ is the grating period. In addition, the small diameter establishes a cut-off frequency. It has been established that an optimal hole spacing (per zone) (L/d) of 1.25 minimizes the cutoff. Y.Fu, C. Du, W. Zhou, L. Lim, "Nanopinholes-Based Optical Superlens," Research Letters in Physics 2008, 148505 (2008). Smaller periodicity seems to yield greater transmission.

Figure 5A:
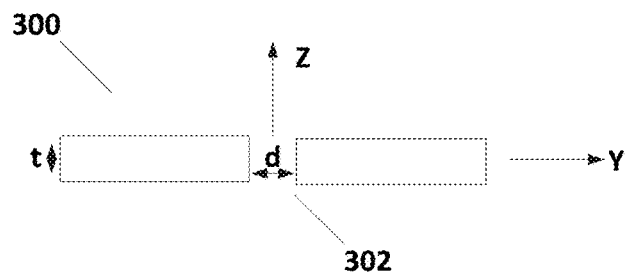
FIGS. 5A, 5B, 5C, 5D, and 5E illustrate transmission characteristics through a pinhole.
Figure 5B:
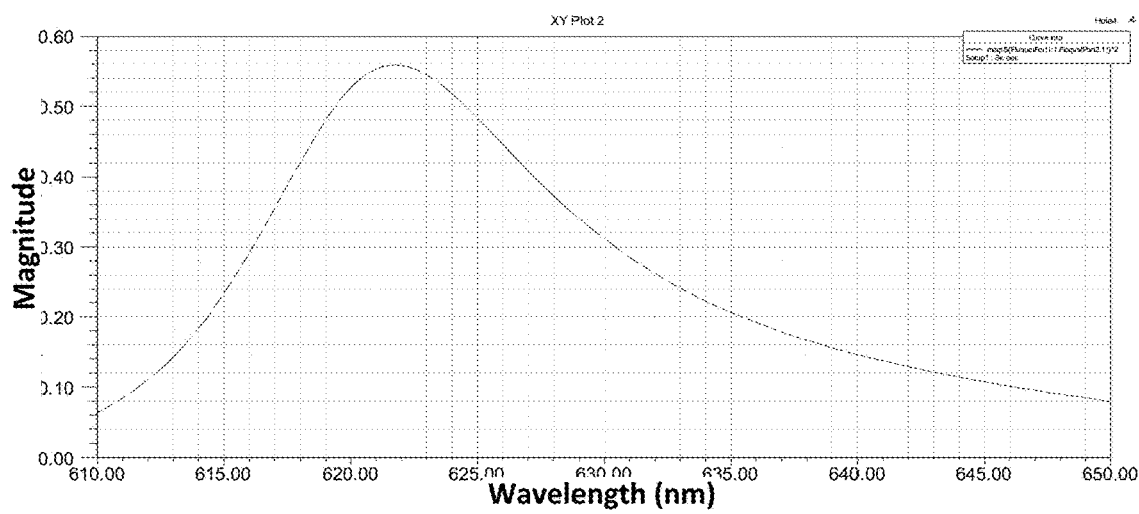
Figure 5C:
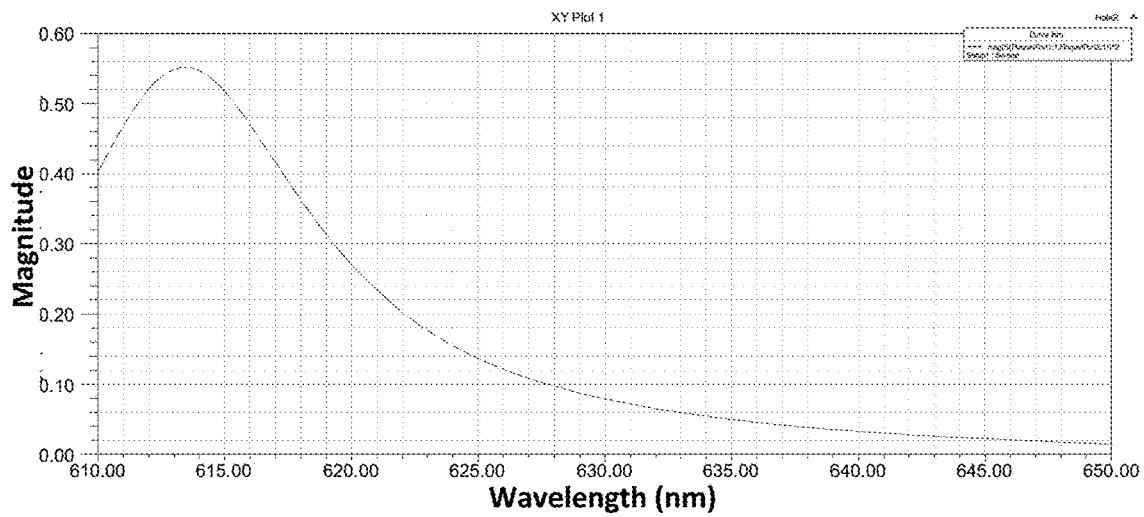
Figure 5D:
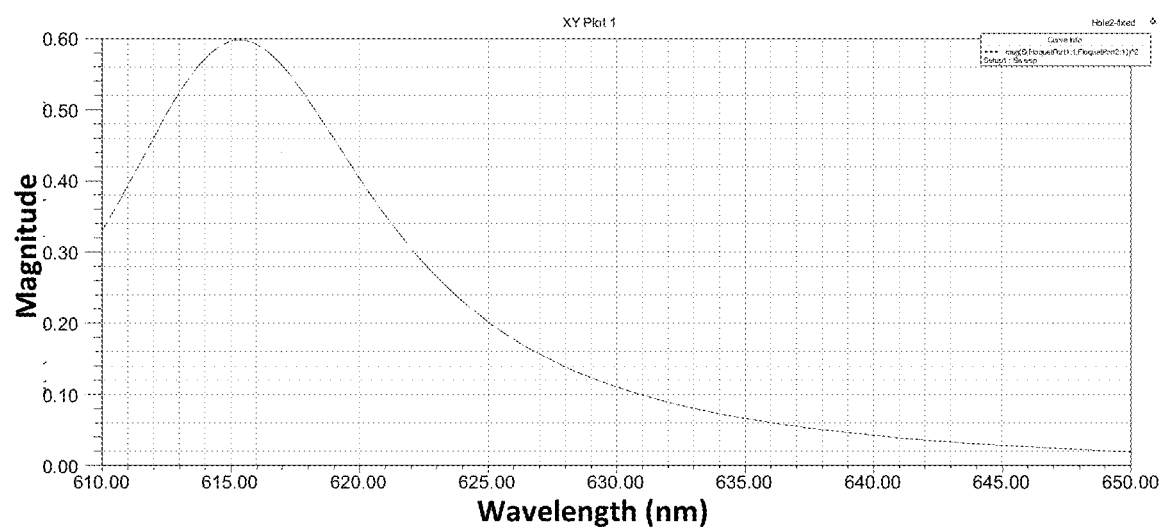
Figure 5E:
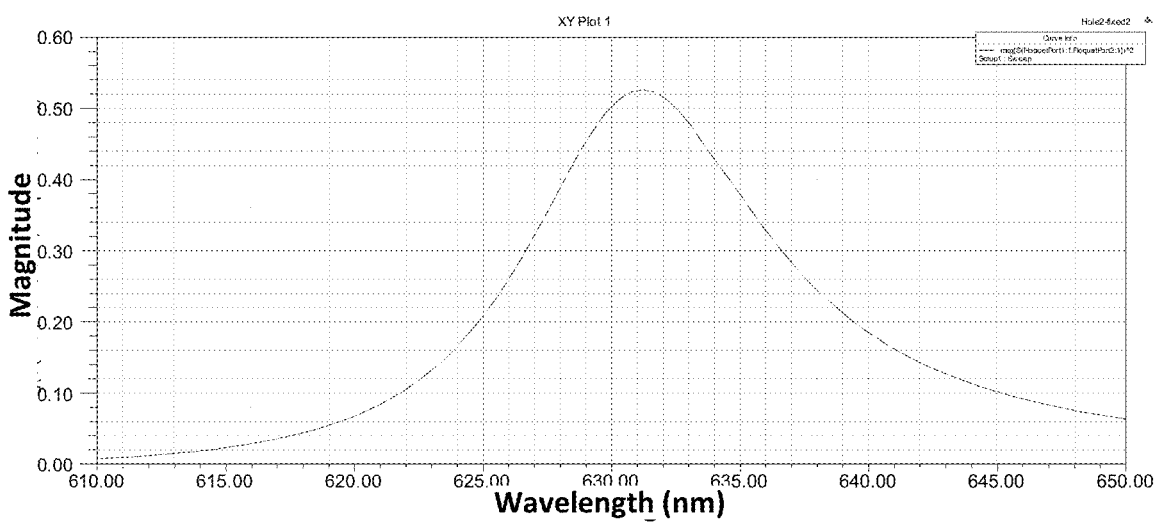

FIG. 5A illustrates a pinhole structure 300 formed in a substrate of thickness t where pinhole 302 has a diameter of d. FIG. 5B illustrates a transmission curve vs wavelength where nano-pinhole 302 is designed around a 633 nm wavelength. The diameter d can be about 0.4 nm. FIG. 5B illustrates the transmission magnitude versus wavelength with an example where the thickness t is 50 nm. As is illustrated, the peak transmission is at about 623 nm. FIG. 5C illustrates an example where the thickness t is increased to 100 nm. As is illustrated in FIG. 5C, the peak transmission has shifted to about 613 nm. FIG. 5D illustrates an example with thickness at 100 nm and a diameter d increased by about 5 nm. As is illustrated, the peak shifted from 623 nm illustrated in FIG. 5C to about 615 nm. FIG. 5E illustrates a case where the thickness is 50 nm and the diameter is increased from that illustrated in FIG. 5B by about 35 nm. As illustrated in FIG. 5E, the peak has shifted to about 633 nm from about 623 nm.

Figure 6A:
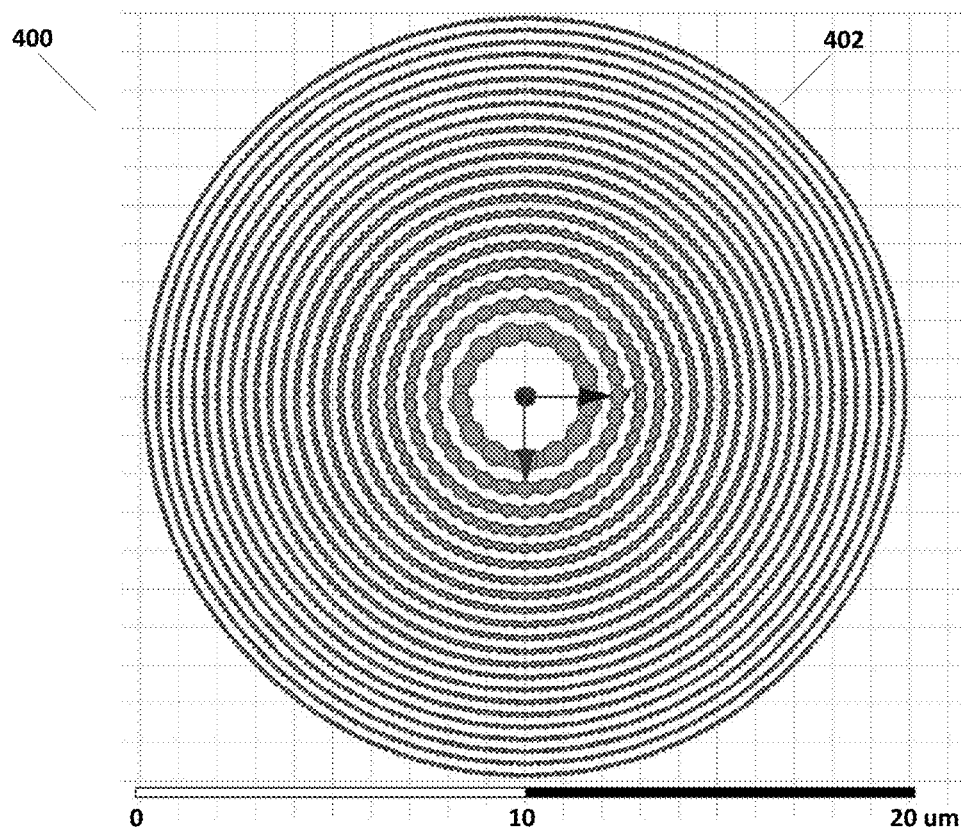
FIGS. 6A and 6B illustrate a nano-pinhole design of a plasmonic microlens filter according to some embodiments.
Figure 6B:
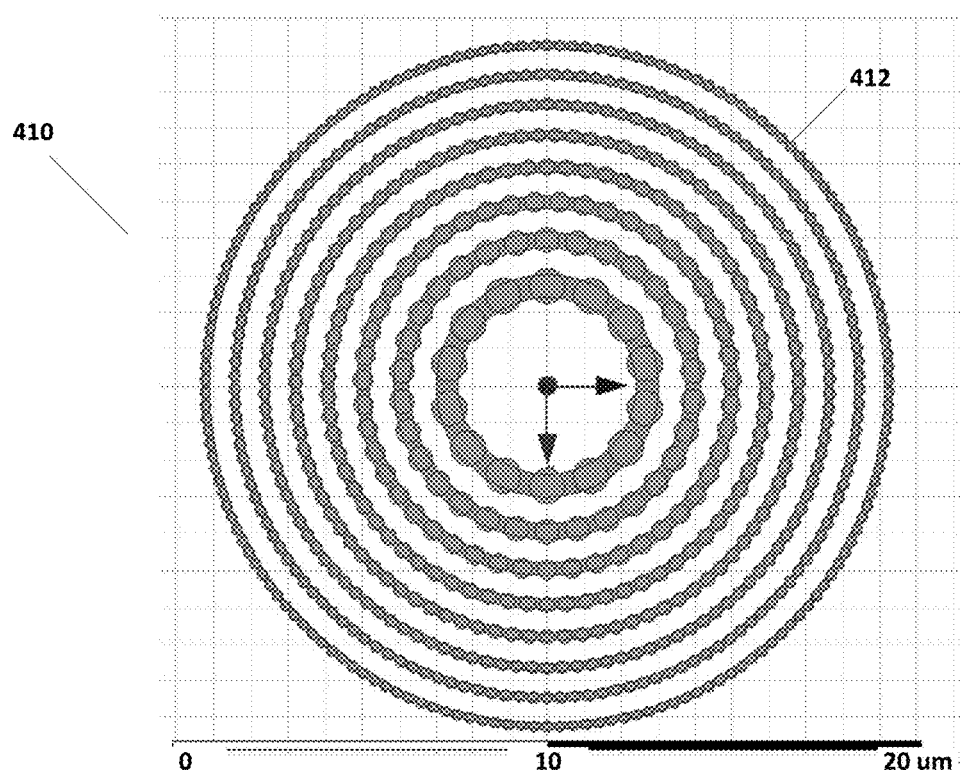

FIGS. 6A and 6B illustrate patterns of nano-pinholes 402 that form plasmonic phase-plates that can operate as filters and/or lenses according to the present invention. As is illustrated in FIGS. 6A and 6B, plasmonic structures 400 and 410 include circular arrangements of nano-pinholes 402 and 412, respectively. As illustrated in FIGS. 6A and 6B, each of these patterns has an extent of about 20 µm.

As is illustrated in FIGS. 6A and 6B, the diameters of the nano-pinholes 402 and 412 are arranged in each circular pattern to arrange for a particular wavelength of light to be focused. The diameters of pinholes 402 and 412 is varied radially and arranged in circles around the center. The diameters and circular radii determine the transmission functions for that particular plasmonic structure. FIG. 6A illustrates an arrangement for 400 nm radiation, having more radial arrangements of smaller pinhole sizes, while FIG. 6B illustrates an arrangement appropriate for 1000 nm light, having fewer radial arrangements with larger pinhole diameters. Such an arrangement as illustrated in structures 400 and 410 filters and focuses light onto an underlying pixel in a sensor array.

Figure 7A:
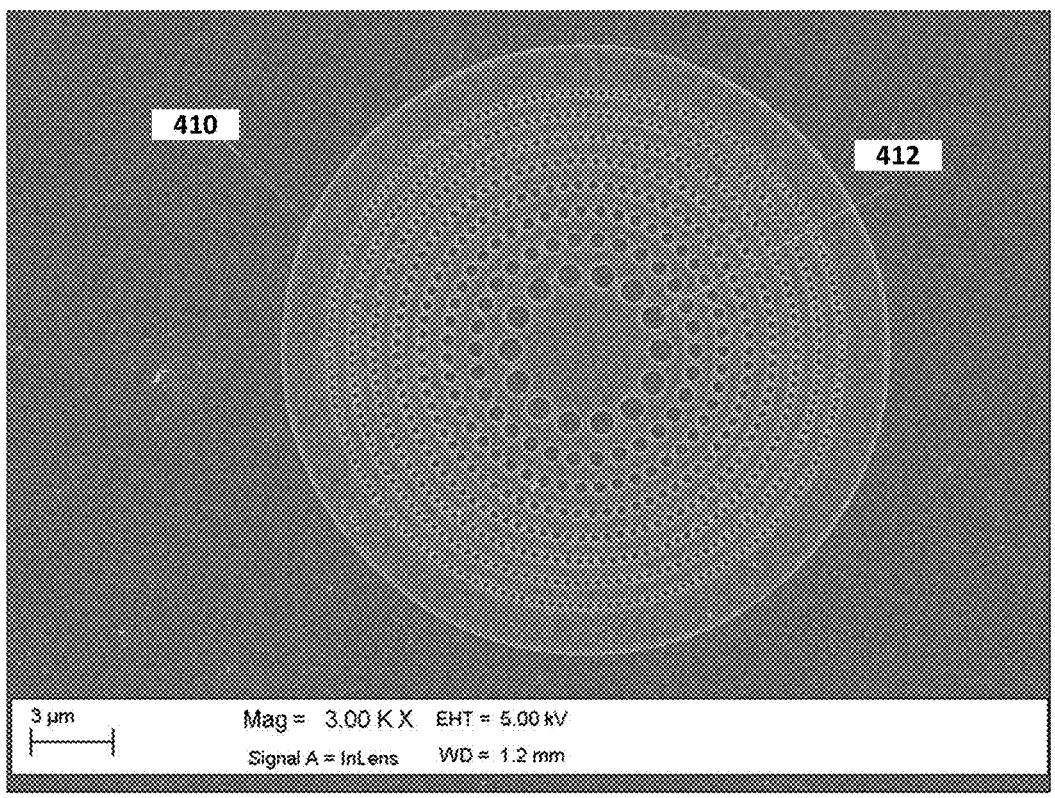
FIGS. 7A and 7B illustrate images of a nano-pinhole design according to some embodiments.
Figure 7B:
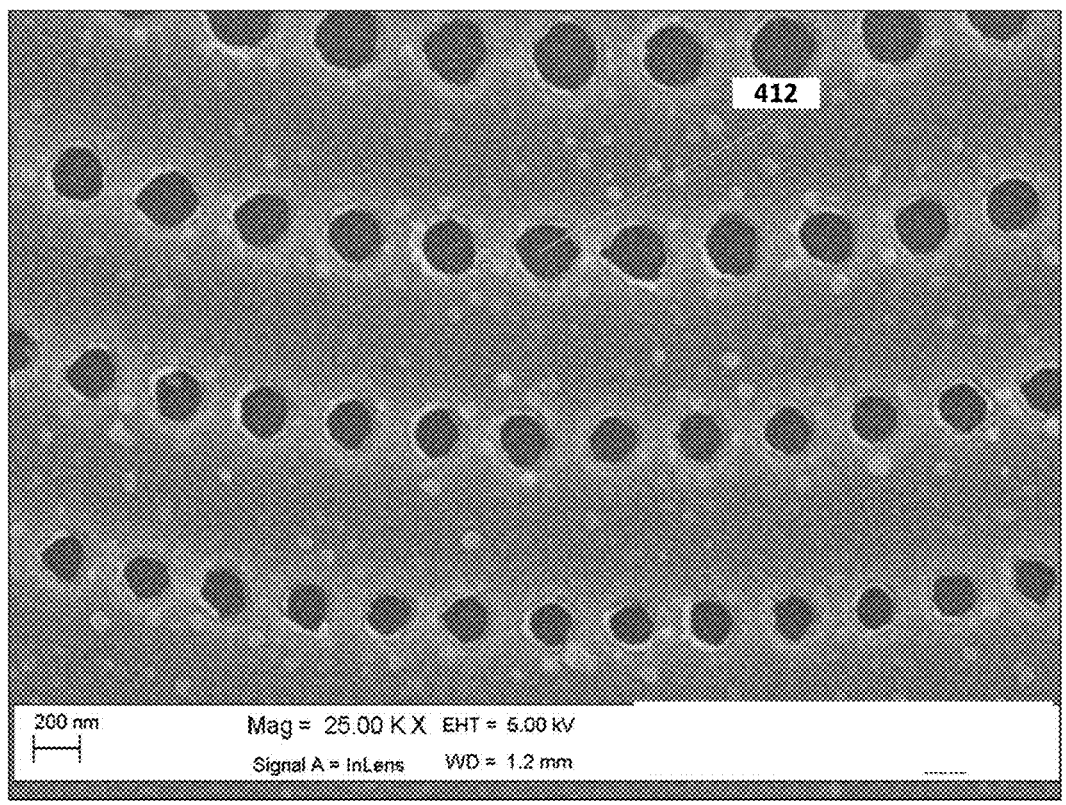

FIGS. 7A and 7B illustrate scanning electron microscope (SEM) images of a plasmonic structure such as structure 410 illustrated in FIG. 6B. FIG. 7A illustrates the arrangement of nano-pinholes 412 and shows the 20 µm extent of structure 410. FIG. 7B illustrates individual pinholes 412, which as indicated can have a diameter that varies with radial extent of the circles. Diameters are on the order of 0.2 µm.

Figure 8:
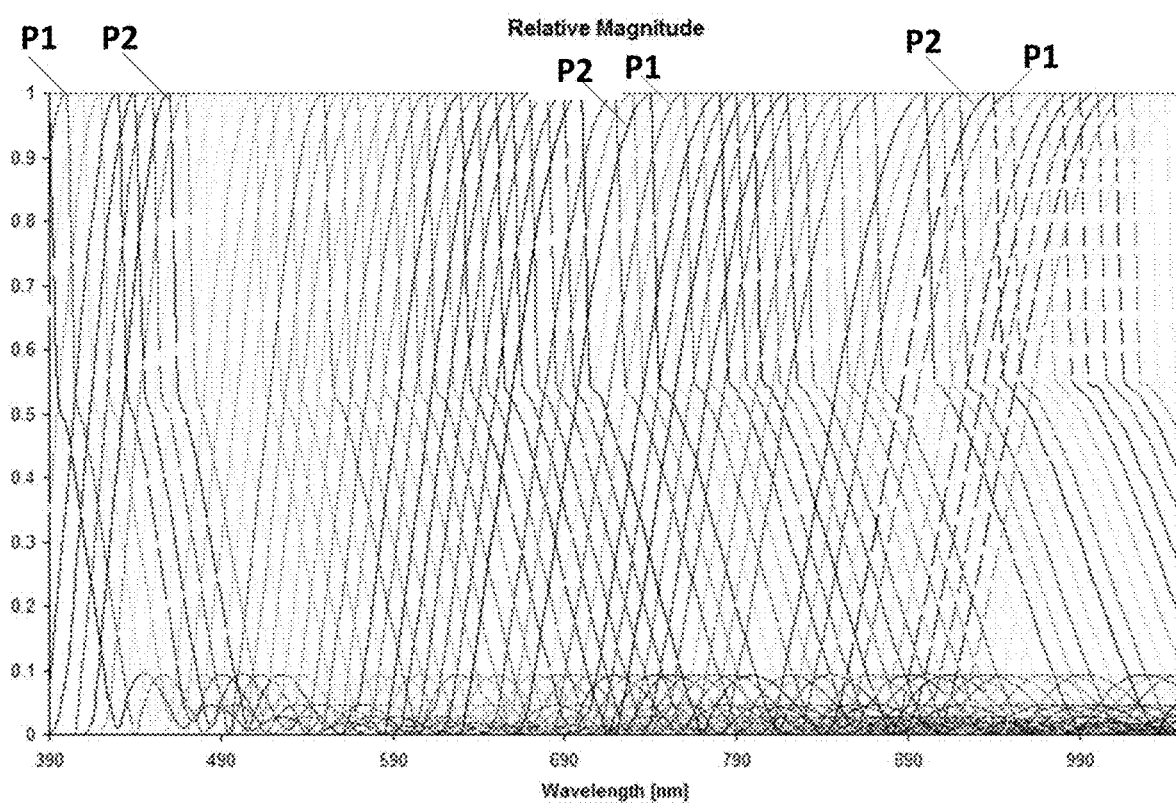
FIG. 8 illustrates the transformation from transmission function to wavelength basis data for a spectrometer according to some embodiments.

FIG. 8 illustrates the transformation from transmission function to wavelength basis data for a spectrometer 200 according to some embodiments. FIG. 8 illustrates the transmission characteristics for an array of pixels 230 in sensor array 204, each with a structure such as that illustrated in FIGS. 6A, 6B, 7A, and 7B, arranged to provide a transmission structure for each individual pixel 230 in sensor array 204. For example, as discussed above, there may be an array of about 100-1000 pixels 230 in sensor array 204. Furthermore, there may be a number of wavelength channels for each of pixels 230 in the array of pixels. Consequently, a spectral transform matrix can be formed, the M×N matrix with the spectral transform functions can then be used to provide wavelength basis data to convert received data to a narrowband spectrum. The large number of channels and high resolution of pixels can result in the narrowband spectrum of received data. Individual transform functions for two pixels, P1 and P2, are specifically pointed out in FIG. 8. However, transform functions for each of the pixels can be determined to form the spectral transform matrix for operation of spectrometer 200.

The spectral transfer functions discussed above with respect to FIG. 8 can be generated by plasmonic filters/microlenses according to some embodiments of the present invention. As discussed above in FIGS. 6A, 6B, 7A, and 7B, these plasmonic filters/microlenses are formed by arrays of holes and rectangles formed. These holes can be formed in a thin metal layer. As discussed above, plasmonic filters are a kind of frequency selective surface, familiar from the microwave domain and now applied to the optical spectrum.

FIGS. 9A and 9B illustrate some examples of frequency selective plasmonic filters. FIG. 9A illustrates a high-pass filter 902 while FIG. 9B illustrates a low-pass filter 914. High pass filter 902, as shown in FIG. 9A, is formed by an array of crossed horizontal wires 906 and vertical wires 904. Wires 906 and 904 are conducting wires and operate to short DC currents, which leads to the reflection of low frequencies. Low-pass filter 914 as illustrated in FIG. 9B is formed by an array of conducting patches 908 separated by horizontal spaces 910 and vertical spaces 912. Low-pass filter 914 admits only frequencies with wavelengths longer than the lateral extent of patches 908. The thickness of patches 908 or wires 904 and 906 may be much thinner than the wavelength of the incident light because the metal conductivity, especially if patches 908 and wires 904 and 906 are formed of a high conductivity metal such as gold, is so high that the penetration depth is small.

Consequently, the incident of light on patches 908 and wires 904 and 906 produce a surface mode of conductivity, which is referred to as a surface plasmon polariton (SPP). SPPs are infrared or visible electromagnetic waves that travel along a metal-dielectric or metal-air interface. In biology, for example, this SPP surface mode is used to detect the binding of proteins to a functionalized gold surface by observing a change in the SPP resonance color. Further, this SPP is what gives gold its yellow color.

By introducing periodic structures such as those illustrated in FIGS. 9A and 9B, light is able to diffract and couple into surface plasmon modes. In some embodiments, arrays of tiny holes can be constructed through which light at a specific frequency resonantly couples into the holes and out the other side of the structure. This transmission phenomenon is called anomalous optical transmission (AOT). Some of the light is compressed to very near the surface by the SPPs, reaches through the other side, then reaches out, interacts with the other holes and diffracts out into free space. That mode of light passes through a metal as if it was not there. Note that this is only possible for a specific frequency range, which is usually a narrow range of frequencies. Also, some of the light is diffracted into higher orders or reflected. However, it is possible to get more than 50% of the light through a surface where less than 50% of the area is holes (hence the term "anomalous" transmission).

Various periodic structures such as those illustrated in FIGS. 6A, 6B, 7A, and 7B can be formed. In some structures, hole arrays can be formed on a metal layer such as indium tin oxide (ITO) provided on a glass substrate. Arrays of holes of various diameters can be formed. For example, holes with diameters as low as 200 nm can be formed.

Fabrication of such structures can be accomplished by deep UV lithography, electron beam (e-beam) lithography, or focused ion beam (FIB) milling. Additionally, e-beam or FIB generated masters can be copied using simple nanoimprint stamping techniques, aka nanoimprint lithography (NIL). Nanoimprint lithography can easily make structures with arrays of holes with diameters as small as 50 nm in diameter. However, registration can be limited by the contact alignment to, for example, about +/−3 μm over a wafer. Consequently, NIL is useful where high resolution is needed, but not careful alignment, and is appropriate for custom optical filters. E-beam techniques are very slow and the resultant cost for a master for a full wafer is not trivial. Consequently, NIL can be used for volume manufacturing of diffractive optical elements like holograms, diffraction gratings, beam shapers (cross-hairs), laser line generators and diffusers, where it can be used even in roll-to-roll processes. Certain manufacturers, for example EVG, use NIL on large areas like Gen 2 display panels (2 meters) where lithography is problematic for scale reasons and features must cross reticles if a stepper or scanner based methods are used.

The holes in the structures can be formed of any shape. Circles, holes, rectangles, bars, vees, C-shapes, or other shapes form a basis for phase control elements, which can be used to tailor the phase at each location on a surface. Microwave designers use stubs and transmission lines to provide similar phase control elements. Nanoplasmonic and nanoptical structures can be considered simply as static phased array antennas for light. They can filter it, bend it, focus it, rotate polarization—whatever can be accomplished by altering of phases or coupling of modes of the light as it propagates through the structure.

Most of the phase elements discussed above are polarization-dependent. In most embodiments of the present invention, non-phase-dependent elements (e.g., squares and circles) can be used so that the resulting spectrometer need not include polarizers. Because the spectral characteristics of elements formed on such structures are highly sensitive to exact dimensions, which are outside of process controls, each device is spectroscopically characterized. This characterization may be done at wafer-level or on panels of assembled spectrometers to maximize throughput and minimize test time. For example, scanning a narrow range of wavelengths over thirty sensors at once using a tunable wavelength light source such as a lamp and monochromator.

In some embodiments, there are 1024 pixels 230 that are included in sensor array 204. Some of pixels 230 will not be used in the transform because the holes were under or over etched. However, pitch and hole size variations are sufficient that each device will have a sufficient number of useful hole sizes for any combination of exposure and etch within process controls.

FIGS. 10A and 10B further illustrate a structure of one pixel 230 according to some embodiments of the present invention. As illustrated in FIG. 10A, consolidated filter-lens 1002 is positioned over aperture 240 above active pixel element 230. FIG. 10B illustrates a planar view of consolidated filter-lens element 1002. In some embodiments, filter-lens 1002 is a plasmonic pinhole array that filters and focuses incident light onto pixel 230. However, filter-lens 1002 can be formed of a plurality of filter-lens elements. As illustrated in FIG. 10B, filter-lens element 1002 can be formed of a plurality of individual plasmonic filter-lens elements 1004, each of them focusing and filtering incident radiation onto the active area of pixel 230. In these embodiments, each of filter-lens 1004 can be identical plasmonic filter structures.

Figure 11:
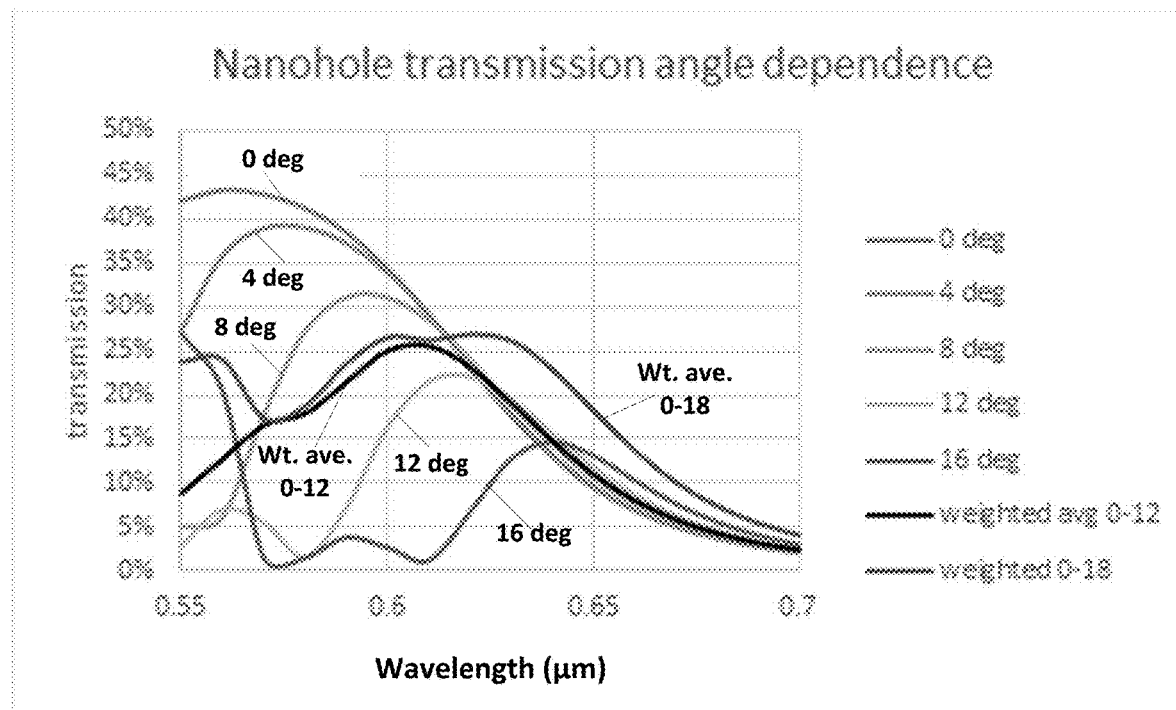
FIG. 11 illustrates a rigorous coupled-wave analysis (RCWA) simulated angular dependence in the transmission vs. wavelength characteristics in an Al nanohole arrays.

It is further desirable for the filter functions to be as sharp as possible, leading to a more positive and diagonal matrix, which is more stable to small variations in pixel values due to noise. The transmission spectra of plasmonic filters are very sharp functions of angle. FIG. 11 illustrates a rigorous coupled-wave analysis (RCWA) simulated angular dependence in the transmission vs. wavelength curves for a sample of Al nanohole array of period 300 nm, thickness 250 nm, and diameter 250 nm. All transmitted orders are included. Off-axis illumination probes the difference in dielectric constant for S and P (TE and TM) polarized waves, hence the observed splitting of the resonance. The average transmission has reduced spectral contrast. In fact, the average has a dip where the 0 deg transmission has a peak. Weighted average includes more of the off-axis light due to the increasing solid angle off-axis as well as a $\cos^6$ factor for proximity sensing due to emitter, target, and receiver projected area and increasing distance with angle due to planarity of the target.

Incident light ray angles are limited to avoid blurring out spectral features of interest. Sharp spectral features and a high degree of orthogonality of the light spectra allow a spectral transform that is robust to noise. However, spectral features with low contrast and slow variation effectively amplify noise in the transform (due to more subtraction and cancellation).

The LED light ray angle distribution can be limited to about +/−30 degrees with a package height of about 1 mm. Taller assemblies allow better focusing of the LEDs. Narrow LED light ray angle distribution provides brighter illumination, but the location where the LED and sensor fields of view overlaps occurs over a smaller range of distances, which consumer applications may not tolerate. Consequently, the wide LED distribution is a use case requirement as well as something difficult to avoid from the physical optics standpoint. Note that the LED angular distribution is directly related to the LED size. Note also that multi-junction LEDs, where a shorter wavelength emitter is monolithically grown over the longer wavelength emitter, allows for a more compact method of obtaining a broad wavelength distribution.

Figure 12:
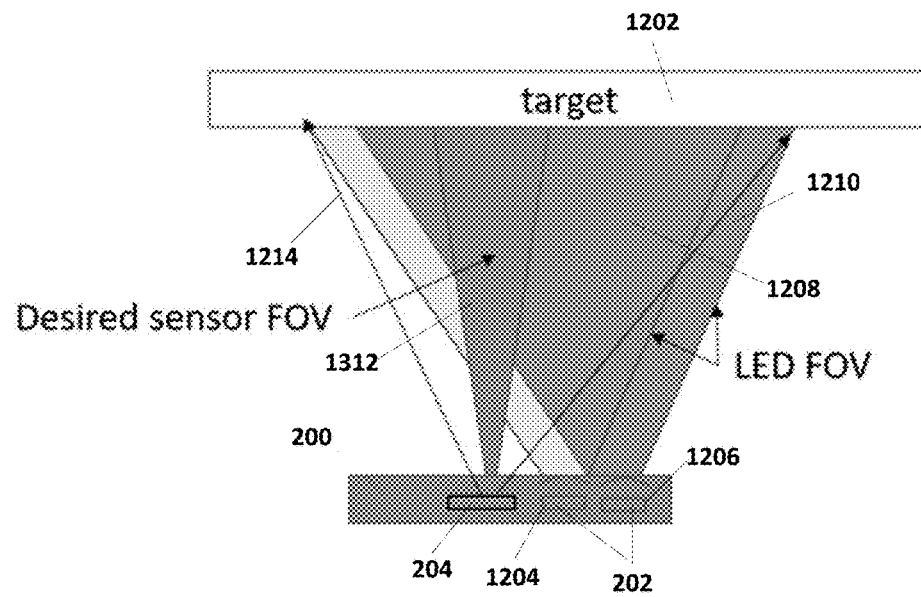
FIG. 12 illustrates field-of-view (FOV) of light source and sensor array in a spectrometer according to some embodiments of the invention.

FIG. 12 illustrates a spectrometer 200 according to some embodiments of the present invention in relation to a target material 1302. As is illustrated in FIG. 12, spectrometer 200 includes a light source 202 with two LEDs, LED 1204 and LED 1206. In general, there may be any number of LEDs in light source 202. As is further illustrated in FIG. 12, LED 1204 has a field-of-view (FOV) 1208 and LED 1206 has an FOV 1210. With regard to the LEDs 1204 and 1206, the FOV refers to the cone of light originating from the LED and illuminating target material 1202.

Sensor array 204 also has a FOV 1212, which is much less than the full extent of the irradiation of target 1202 as indicated by irradiation cone 1214. As illustrated in FIG. 12, FOV 1212 of sensor array 204 indicates that sensor array 204 senses from a much smaller region than that illuminated. The smaller FOV of sensor array 204 limits spectral variation of the sample region and limits off-axis blurring of spectral features of interest.

Figure 13:
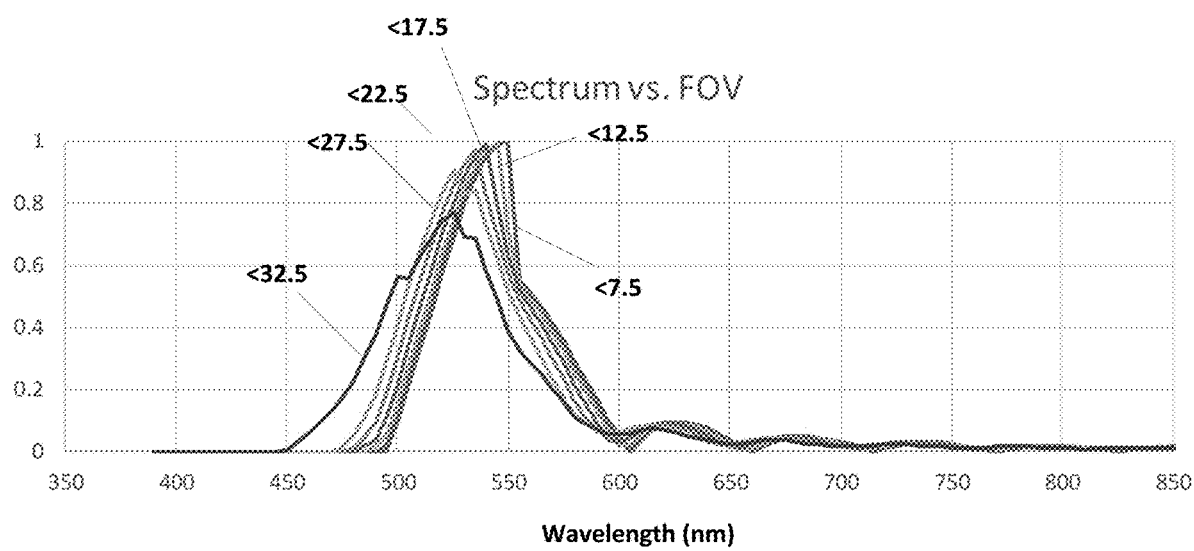
FIG. 13 illustrates the FOV characteristics of a plasmonic filter/microlens according to the present invention.

FIG. 13 illustrates the FOV characteristics of a plasmonic structure such as that illustrated in FIGS. 6A, 6B, 7A, and 7B. In addition to providing good transmission functions as illustrated in FIG. 8, the angular FOV characteristics illustrated in FIG. 13 are favorable. As illustrated, individual curves for FOVs of <7.5, <12.5, <17.5, <22.5, <27.5, and <32.5 degrees is provided using the structure illustrated in FIG. 7A. As illustrated, the transmission spectrum blue-shifts in wavelength as a function of the FOV in a well regulated way. The example illustrated in FIG. 13 illustrates about a 1 nm shift per degree in wavelength. This is a much better response than that illustrated in FIG. 11 above with respect to structures such as that illustrated in FIG. 10.

In competitor devices, the FOV of an image sensor is controlled with external optics. This leads to a complex and bulky design not desirable for mobile applications. One solution would seem to be to put microlenses on the sample and focus the received light through an aperture, however this is also not a desirable structure for a consumer product.

The devices illustrated in FIG. 10 focus light as a function of wavelength, but do not operate appropriately as a filter. In some conventional cameras with integrated color filters, microlenses have been assembled over the top of the color filters. It is quite different to imagine an embedded microlens. Refractive microlenses work by refractive index contrast, so burying them in a dielectric of likely similar index with a planarizing layer for deposition of an overlaying filter reduces their focal power tremendously.

Figure 14A:
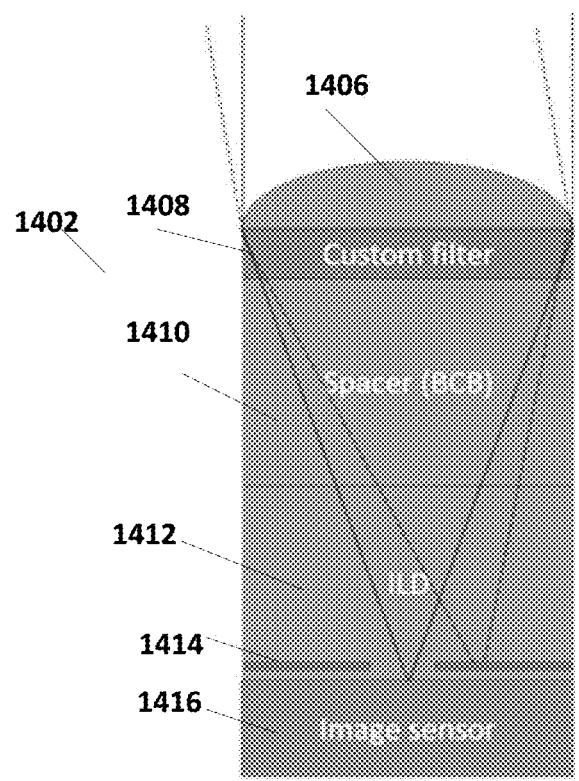
FIGS. 14A and 14B illustrate construction of some spectrometers that do not function well.
Figure 14B:
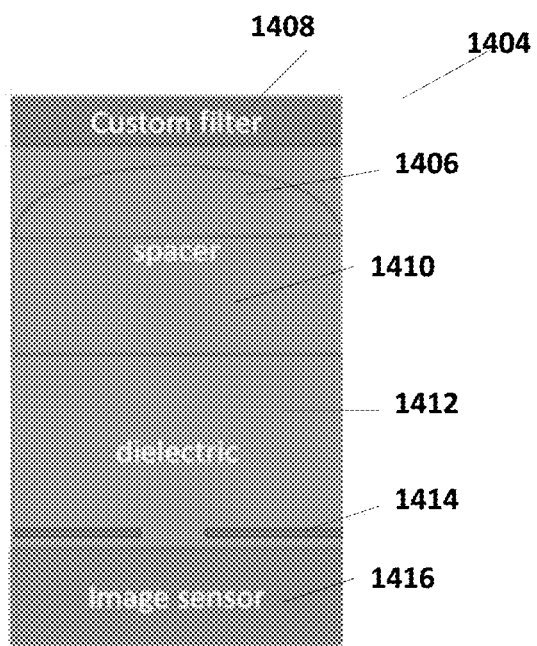

FIGS. 14A and 14B illustrate construction of two examples of conventional sensor systems with index-based microlenses, which do not function very well. FIG. 14A illustrates a sensor system 1402 and FIG. 14B illustrates a sensor system 1404, each with an image sensor 1416, an aperture layer 1414 formed over image sensor 1416. A dielectric layer 1412 covers aperture layer 1412 and image sensor 1416. A spacer layer 1410 is formed over dielectric layer 1412. A plasmonic filter 1408 is formed over spacer layer 1410. In sensor system 1402, a standard image sensor color filter microlens 1406 is deposited over plasmonic filter 1408. In sensor system 1404, filter 1406 is embedded in spacer 1410.

Consequently, in example system 1402 the standard image sensor color filter microlens 1406 is deposited over plasmonic filter 1408. Then lens 1406 focuses the light through a pinhole in aperture array 1414, which limits the field of view of lens 1406. However, system 1402 magnifies the incident angle which recreates the original problem of such systems. Also, sensor system 1402 cannot be potted in with an encapsulant or system 1402 suffers the same problem as system 1404 illustrated in FIG. 14B. In system 1404, where the refractive microlens 1406 is placed under plasmonic filter 1408, everything has basically the same index of refraction and lens 1406 effectively disappears in spacer 1410. The knowledge extant in previous systems discourages the use of microlenses beneath spectral filters. However, metal-based plasmonic structures as are provided in embodiments of the present invention, work even when embedded in transparent dielectrics. One solution for making lenses without relying on curvature is a diffractive optical element, or Fresnel Zone Plate.

Figure 15:
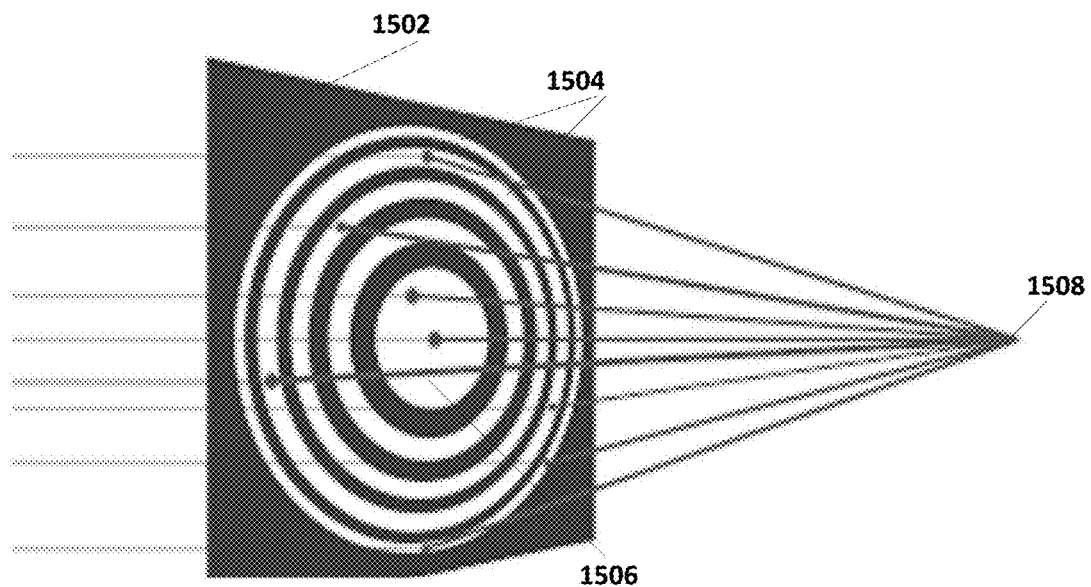
FIG. 15 illustrates a Fresnel Zone Plate.

FIG. 15 illustrate a Fresnel lens 1502 that can focus light and that can be used in such systems. As illustrated in FIG. 15, lens 1502 is formed with ringed grooves 1504 around a central opening 1506. Tighter pitched grooves 1502 at the outer edge cause more diffraction, leading to a focusing effect to focus light onto focal point 1508. Lens 1502, however, requires adequate thickness of different index materials to obtain the required phase shift in each ring 1504. Consequently, lens 1502 suffers the same problem as refractive lenses, namely that it disappears under water or a planarizing/encapsulating layer like PMMA (Poly(methyl methacrylate)), SU8, or BCB (Benzocyclobutene). This diffractive effect is observed on the surfaces of CDs, for example.

Regardless of the solution to be used, the alignment of the microlens to the pinholes in the aperture array according to some embodiments sets the overall scale for the pixel 230 and spacer 234. In embodiments of the present invention, the NIL equipment used can provide 3 µm accuracy. Consequently, the lens should be about 12 microns away for a 3 µm pinhole to limit the angular error to about 12.5 degrees. This is a steering error, where one pixel faces a different direction than nominal. Luckily NIL errors are gradual across a wafer so local differences in misalignment may be small and negligible. Each device according to some embodiments can be calibrated according to its specific misalignment as described above. The light source doing the spectral characterization should have a wide enough illumination range of angles to fill each aperture 240 in aperture array 232.

Figure 16:
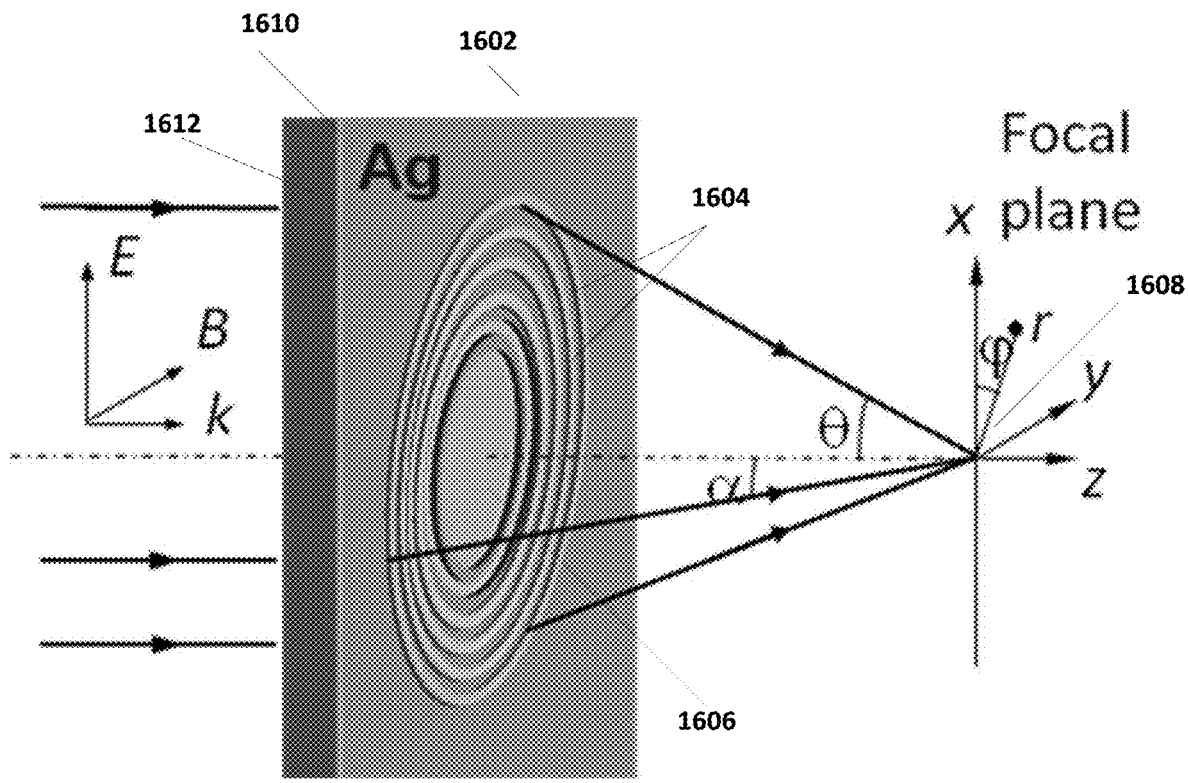
FIG. 16 illustrates a plasmonic multi-zone plate.

Further, instead of the Fresnel Zone Plate lens 1502 as is illustrated in FIG. 15, embodiments of the present invention can use a plasmonic diffractive lens. For example, a plasmonic multi-zone plate (PMZP) 1602 such as that illustrated in FIG. 16 can be used in some embodiments of the present invention as a lens. As is illustrated in FIG. 16, PMZP 1602 is formed by a gold film 1610 deposited on a substrate 1612. As is illustrated in FIG. 16, rings 1610 and center portion 1606 are formed in gold film 1610 and allow for focusing incident light onto a focal point 1608. FIG. 16 illustrates the geometry of operation of PMZP 1602 with an electric field incident on PZMP 1602 and being focused on focal point 1608.

Consequently, a spectrometer system can be formed that combines a plasmonic filter and a plasmonic multi-zone plate as a composite filter-microlens. In some embodiments, separate plasmonic filters and plasmonic multi-zone plates can be formed. In some embodiments, a combined plasmonic filter and plasmonic multi-zone plate can be formed in a single filter/microlens structure.

Figures 17A, 17B, 17C:
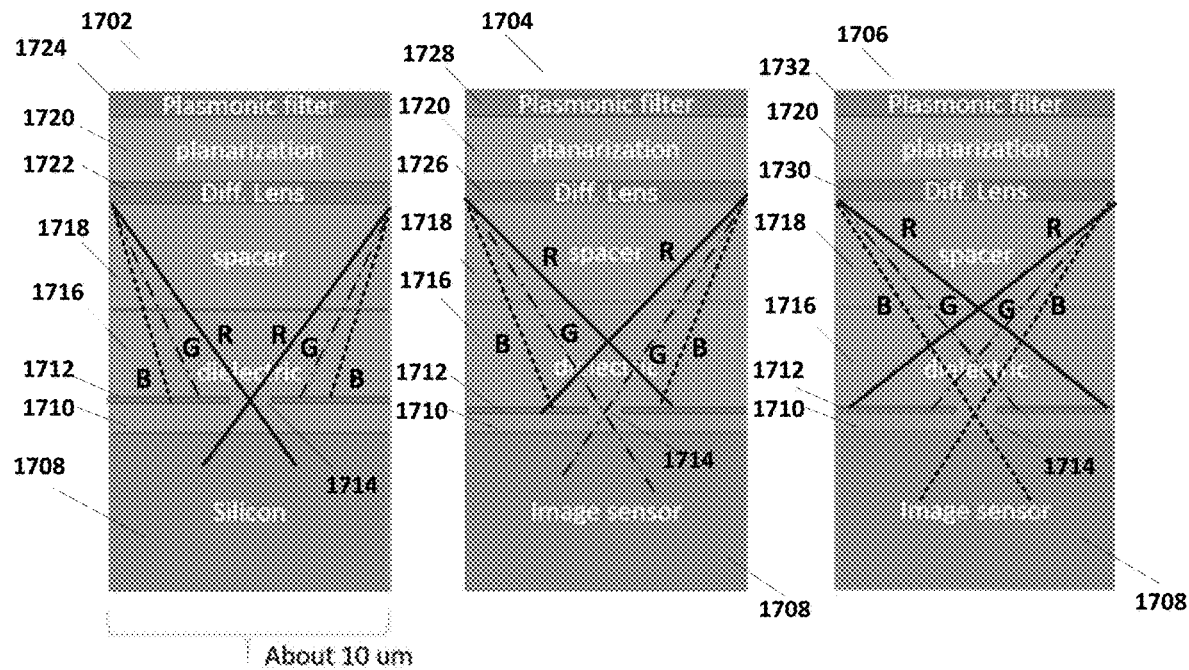
FIGS. 17A, 17B, and 17C illustrate different pixels of a spectrometer system according to some embodiments.

FIGS. 17A, 17B, and 17C illustrate different pixels of a spectrometer system 1700 according to some embodiments of the present invention. FIGS. 17A, 17B, and 17C illustrate the structure around individual pixels 230 illustrated in FIG. 2D, for example. FIG. 17A illustrates a pixel 1702 that detects red light. FIG. 17B illustrates a pixel 1704 that detects green light. FIG. 17C illustrates a pixel 1706 that detects blue light. In FIGS. 17A, 17B, and 17C, red light is depicted by the solid line, green light is depicted by the line with a dash-dot pattern, and blue light is depicted by the dashed line. The sensor array can include other pixels that detect other wavelengths of the spectrum.

Each of pixels 1702, 1704, and 1706 have an active area 1708. As illustrated in FIGS. 17A, 17B, and 17C includes a first dielectric layer 1710 formed on sensor array 1708. An aperture array 1712 with a hole 1714 over an active area of sensor array 1708 is formed on first dielectric layer 1710. As was discussed previously, in some embodiments aperture array 1712 is formed directly on sensor array 1708. A second dielectric array 1716 is formed over aperture array 1712. A spacer 1718 is formed over second dielectric layer 1716. Each of pixels 1702, 1704, and 1706 also include a planarization layer 1720 deposited between a diffractive lens and a plasmonic filter.

FIG. 17A includes a diffractive lens 1722 formed on spacer 1718. Planrization layer 1720 is formed on diffractive lens 1722. A plasmonic filter 1724 is formed over planarization layer 1720. Diffraction lens 1722 can be a plasmonic diffractive lens as discussed, for example, in FIG. 16 and is not affected by being embedded between spacer layer 1718 and planarization layer 1720. Plasmonic filter 1724 is then formed over planarization layer 1720. In pixel 1702, plasmonic filter 1724 and diffractive lens 1722 are arranged such that red light is focused through aperture array 1712 into the active layer of sensor array 1708.

Pixel 1704 as illustrated in FIG. 17B is similar to pixel 1702 illustrated in FIG. 17A. The difference is that pixel 1704 includes diffractive lens 1726 and plasmonic filter 1728 which focuses green light instead of red line into the active layer of sensor array 1708.

Pixel 1706 as illustrated in FIG. 17C is similar to pixels 1702 and pixels 1704.

The difference is that pixel 1706 includes diffractive lens 1730 and plasmonic filter 1732 that focuses blue light into the active area of sensor array 1708.

One advantage of the diffractive lens 1722 or 1726 or 1730 is that the focal length depends linearly on the wavelength of the incident light so each lens can be optimized to further down-select the spectral range admitted through hole of aperture array 1702. Thus, aperture array 1702 functions like an additional band pass filter.

As is illustrated in FIG. 17A, each pixel in a system can be about 10 μm in extent. An array of such pixels can therefore be arranged to provide spectroscopic data across a large range of spectral wavelengths in order to analyze the spectrum received from a target.

The pixel array formed by pixels as illustrated in FIGS. 17A, 17B, and 17C can have a coupling between the plasmonic filters that can be reduced sufficiently with a thick space—limited by processing ease and cross talk concerns due to the finite pixel pitch of about 25 μm. However, these systems can be formed with nanoimprint processing steps. It should, however, be noted that in some embodiments a dry etch (e.g. ion beam etching) process through all that spacer polymer is performed to reveal the bond pads in order to electrically couple to each pixel.

As illustrated in FIGS. 17A, 17B, and 17C, the filter transmission peak wavelengths in plasmonic filters 1724, 1728, and 1732 is varied according to the design of the plasmonic microlens 1722, 1726, and 1730. Consequently, each pixel is arranged to receive light with a particular transmission function.

Figures 18, 19:
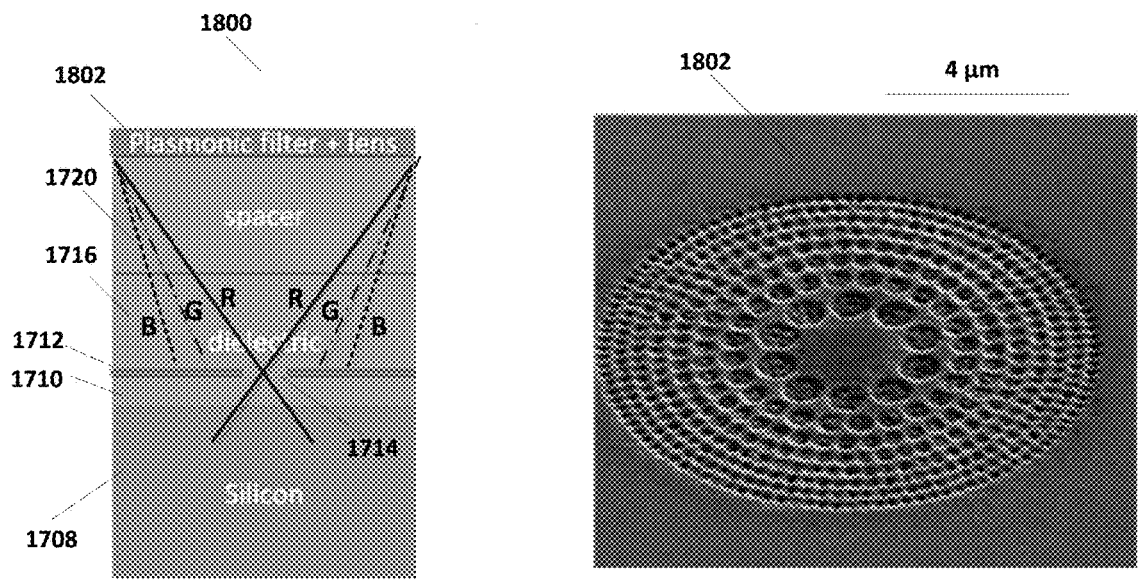
FIG. 18 illustrates a pixel construction of another spectrometer system according to some embodiments.
FIG. 19 illustrates a composite filter-microlens that can be used in some embodiments of the present invention.

Sequential plasmonic filters can often be combined such that filtering and focusing can be done in a single element. FIG. 18 illustrates another example of a pixel 1800 according to some embodiments of the present invention. As illustrated in FIG. 18, the diffractive lens and the plasmonic filter are combined into a single filter and lens 1802 that is formed on spacer 1720.

The Plasmonic Micro Zone Plate structure as shown in FIG. 16 can be used for spectrally filtering and for focusing light (spatially filtering) through pinholes in the metal layer of the filter through strong engineered chromatic dispersion, radial diffraction, plasmonic resonance and plasmonic superoscillation.

FIG. 19 illustrates a combined plasmonic filter and diffractive lens structure formed as a plasmonic micro-zone plate that can be used as filter/lens 1802. As is illustrated in FIG. 19, each filter/lens 1802 is formed by concentric circles of pinholes of varying diameter in order to both filter and focus the incident light according to the requirements of each pixel in the pixel array that forms the spectrometer. As such, the spectral information of the incoming light is spread across the array of pixels. As illustrated in FIG. 19, the diameter of filter/lens 1802 can be about 10 μm. In general, filter/lens 1802 can be from 5 to 20 μm or greater in diameter.

As discussed above, embodiments of the invention do not depend on unifying the filtering and focusing functions in one structure. Spectrometers according to some embodiments can be formed with separate plasmonic filters and plasmonic diffraction lenses. In some embodiments, spectrometers can be formed with a combined plasmonic filter/lens structure.

Consequently, a spectrometer according to some embodiments can include a planar array of light sensing pixels formed with optically active regions separated by a pixel pitch distance. The light-sensitive regions each includes a light-sensing surface that is sensitive to a range of detectable wavelengths. An array of light transmitting aperture areas are formed over the pixel array. An array of plasmonic filters defined by sub-wavelength features formed in a metal layer is disposed over the pixels. The filters have characteristic feature dimensions affecting the light transmission spectrum which are varied over the pixels. A dielectric spacer layer is formed between the filters and pixel aperture area and an array of diffractive or plasmonic light focusing microlenses is formed on the spacer layer, which forms individual microlenses over each of the pixels. The individual microlenses are registered to individual aperture areas of the sensor array so that light incident on the microlenses (after having been filtered by the filters) is focused on the individual aperture areas of the sensor array.

In some embodiments, the microlens array and the filter array are consolidated into a single composite filter-microlens array. In embodiments that do not include a single composite filter-microlens array, the dielectric layer (or planarization layer) between the microlens array and filter layers may be greater in thickness than the detectable wavelengths of light transmitted through the filter.

In general, the range of detectable wavelength in spectrometer 200 can be any range useful for the detection of spectra from target materials. In some embodiments, the range of detectable wavelength may include visible light, may include near infrared light, may include UV light, or may include ranges of light that span across these ranges. For example, the range of detectable wavelength comprises wavelengths may be less than 1100 nanometers, or less than 2.5 microns.

Further, light source 202 can provide any range of light to excite substances in the target to provide light received by spectrometer 200. In particular, light source 202 can be, for example, a phosphor-converted LED flash or a flash comprising an array of LEDs of varied wavelengths.

The array of microlenses in microlens array 236 includes individual microlenses formed in a metal layer having radially varied phase elements comprising apertures of varied shape or size. The individual microlenses provide a wavelength-dependent focal length and radial variation of the individual microlenses in the array are varied over the pixels to provide an array of varied wavelengths at which the focal length corresponds to the thickness of spacer layer 234. In some embodiments, spacer layer 234 can have a thickness greater than 5 microns or greater than 10 microns. In some embodiments, microlens layer 236 may be formed in a metal layer that is encapsulated in dielectric.

The pixel pitch of sensor array 204 can be characterized as the less of two pixel pitches in the plane of the array. In some embodiments, the diameter of individual microlenses 242 can be 10 microns, or greater than 10 microns. Microlens diameters of less than 10 microns may be used. In some embodiments, apertures 240 may have a circular region of less than 4 microns diameter, although larger diameters may be used as well. Consequently, the pitch of individual light detecting elements may be greater than the size of the microlens diameter, or in these examples greater than 10 microns. In particular, the pitch of individual light detecting elements may be greater than 15 or greater than 20 microns.

The above detailed description is provided to illustrate specific embodiments of the present invention and is not intended to be limiting. Numerous variations and modifications within the scope of the present invention are possible. The present invention is set forth in the following claims.

What is claimed is:

1. A spectrometer, comprising:
 a controller;
 a sensor array with a pixel array formed by a plurality of pixels, the pixels being coupled to the controller; and
 an optical layer over the sensor array, the optical layer including
  a spacer layer positioned over the sensor array,
  a plasmonic microlens array including a plurality of microlenses positioned over the spacer layer to focus light on the plurality of pixels, and
  a plasmonic filter array arranged with the plasmonic microlens array such that light is incident on each of the plurality of pixels in accordance with a transmission function for that pixel, wherein the transmitted optical spectrum to each pixel in the sensor array varies across the plurality of pixels of the image sensor,
 wherein the plurality of pixels of the sensor array selectively receive light from a foci of the plasmonic microlens array through the optical layer and generate the spatially and spectrally filtered signals accessible by the controller, and
 wherein the plasmonic microlens array and the plasmonic filter array arranged to provide the corresponding pixel in the array of pixels with wavelengths according to an arranged distribution across the pixel array of a number of transfer functions.

2. The spectrometer of claim 1, wherein the plasmonic filter array is formed by patterns of holes in a filter metallic layer.

3. The spectrometer of claim 1, wherein the plasmonic microlens array is formed by patterns of holes in a lens metallic layer.

4. The spectrometer of claim 1, wherein the spacer layer comprises a dielectric layer between the sensor array and the plasmonic microlens array.

5. The spectrometer of claim 4, wherein a dielectric thickness of the dielectric layer is five times greater than a wavelength of light transmitted through the plasmonic filter array.

6. The spectrometer of claim 1, wherein a diameter of each microlens in the plasmonic filter array is 10 µm or greater.

7. The spectrometer of claim 1, wherein a pitch of microlenses in the plasmonic filter array is 15 µm or greater.

8. The spectrometer of claim 1, wherein a focus of each of the microlenses in the plasmonic filter array is matched with a thickness of the spacer layer.

9. The spectrometer of claim 8, wherein the thickness of the spacer layer is greater than 5 microns.

10. The spectrometer of claim 1, wherein a range wavelengths of light transmitted through the plasmonic filter includes visible light.

11. The spectrometer of claim 1, wherein a range wavelengths of light transmitted through the plasmonic filter include near infrared light.

12. The spectrometer of claim 1, wherein a range wavelengths of light transmitted through the plasmonic filter includes UV light.

13. The spectrometer of claim 1, wherein a range wavelengths of light transmitted through the plasmonic filter is less than 2.5 microns.

14. The spectrometer of claim 1, further including a cover with a limiting aperture over the optical layer.

15. The spectrometer of claim 1, further including a light source coupled to the controller.

16. The spectrometer of claim 15, wherein the light source includes one or more light-emitting diodes (LEDs).

17. The spectrometer of claim 1, wherein the light source includes an LED flash driven by a flash driver controlled by the controller.

18. The spectrometer of claim 17, wherein the LED flash is a phosphor-converted LED flash.

19. The spectrometer of claim 17, wherein the LED flash includes an array of LEDs producing light in a range of wavelengths.

20. The spectrometer of claim 19, wherein the LEDs comprise multiple junction LEDs, where the multiple junctions emit at distinct wavelengths.

21. The spectrometer of claim 1, further including
a light source driver coupled between the controller and a light source;
an image sensor driver coupled between the controller to provide signals to the sensor array; and
a readout coupled to receive current signals from each of the pixels in the plurality of pixels and provide digitized signals to the controller.

22. The spectrometer of claim 21, wherein the controller additionally comprises a microcontroller.

23. The spectrometer of claim 22, wherein the microcontroller is incorporated with a mobile device.

24. The spectrometer of claim 22, wherein the microcontroller includes a spectrometer calibration, wherein each pixel in the pixel array has a unique transmission function in the number of transfer functions.

25. The spectrometer of claim 24, wherein the transfer functions are stored in the microcontroller.

26. The spectrometer of claim 24, wherein the transfer functions are accessible by the microcontroller.

27. The spectrometer of claim 1, wherein the number of transfer functions is greater than 20.

28. The spectrometer of claim 1, additionally comprising an aperture array between the pixel array and the spacer layer such that apertures of the aperture array are aligned with the focus of corresponding microlenses in the plasmonic microlens array.

29. The spectrometer of claim 28, wherein a diameter of apertures of the aperture array that is less than five times a diameter of the corresponding microlens in the plasmonic microlens array.

30. The spectrometer of claim 1, wherein the controller selects data from pixels at the foci of the microlenses.

31. A spectrometer, comprising:
a controller;
a sensor array with a pixel array formed by a plurality of pixels, the pixels being coupled to the controller; and
an optical layer over the sensor array, the optical layer including
a spacer layer positioned over the sensor array,
a plasmonic microlens array including a plurality of microlenses positioned over the spacer layer to focus light on the plurality of pixels, and
a plasmonic filter array arranged with the plasmonic microlens array such that light is incident on each of the plurality of pixels in accordance with a transmission function for that pixel, wherein the transmitted optical spectrum to each pixel in the sensor array varies across the plurality of pixels of the image sensor,
wherein the plurality of pixels of the sensor array selectively receive light from a foci of the plasmonic microlens array through the optical layer and generate the spatially and spectrally filtered signals accessible by the controller, and
wherein the plasmonic filter array and the plasmonic microlens array is formed as a composite filter-microlens array in a single patterned metallic layer.

32. The spectrometer of claim 31, wherein the composite filter-microlens is formed as a plasmonic micro-zone plate structure.

33. The spectrometer of claim 32, wherein each microlens in the plasmonic filter array is arranged as concentric rings of holes of different diameters, the arrangement of holes being dependent on wavelength dependent filtering and focusing for the corresponding pixel.

34. The spectrometer of claim 31, wherein a composite filter-microlens in the composite microlens array includes a plurality of individual filter-microlens structures.

* * * * *